United States Patent
Reijersen Van Buuren et al.

(10) Patent No.: US 10,194,593 B2
(45) Date of Patent: Feb. 5, 2019

(54) CONTINUOUS BALE FORMING APPARATUS WITH A ROTATING BALE PUSHING DEVICE

(71) Applicant: FORAGE COMPANY B.V., Maassluis (NL)

(72) Inventors: Willem Jacobus Reijersen Van Buuren, Maassluis (NL); Rudy De Jong, Maassluis (NL)

(73) Assignee: Forage Company B.V., Maassluis (NL)

( * ) Notice: Subject to any disclaimer, the term of this patent is extended or adjusted under 35 U.S.C. 154(b) by 607 days.

(21) Appl. No.: 14/956,099

(22) Filed: Dec. 1, 2015

(65) Prior Publication Data
US 2016/0088796 A1    Mar. 31, 2016

Related U.S. Application Data

(63) Continuation of application No. 14/395,786, filed as application No. PCT/NL2013/050289 on Apr. 19, 2013, now Pat. No. 9,198,360.

(30) Foreign Application Priority Data

Apr. 20, 2012   (NL) ...................................... 2008667
Apr. 20, 2012   (NL) ...................................... 2008668

(51) Int. Cl.
*A01F 15/08*    (2006.01)
*A01F 15/07*    (2006.01)

(52) U.S. Cl.
CPC ........ *A01F 15/0705* (2013.01); *A01F 15/071* (2013.01); *A01F 15/0883* (2013.01);
(Continued)

(58) Field of Classification Search
CPC ............... A01F 15/071; A01F 15/0705; A01F 15/0883; A01F 2015/0735; A01F 2015/074; A01F 2015/075; A01F 2015/078
(Continued)

(56) References Cited

U.S. PATENT DOCUMENTS 4,062,172 A * 12/1977  Rice ..................... A01F 15/0705
                                                            100/77
4,534,285 A *  8/1985  Underhill ............ A01F 15/0705
                                                            100/88
(Continued)

FOREIGN PATENT DOCUMENTS

EP       0 064 117 A1    11/1982
EP       0 672 340 B1     4/2000
(Continued)

*Primary Examiner* — Jimmy T Nguyen

(57) ABSTRACT

A bale forming apparatus and a bale forming method form cylindrical bales. A bale forming chamber is surrounded by a bale forming mechanism. A bale is formed in this bale forming chamber. This bale is pushed onto a bale supporting construction. This bale supporting construction buffers the bale. A further bale is created in the bale forming chamber. One pushing member pushes the old bale from the bale forming chamber onto the bale supporting construction. This pushing member is connected with a holding device and performs a movement on a circular path for pushing the bale. The drive rotates the holding device around a rotating axis. A pivotal guiding member is pivoted into a guiding position and contributes to provide a bale forming chamber for the new bale.

23 Claims, 21 Drawing Sheets

(52) U.S. Cl.
CPC ... *A01F 2015/074* (2013.01); *A01F 2015/078* (2013.01); *A01F 2015/0735* (2013.01)

(58) Field of Classification Search
USPC .......................... 100/40, 75, 87, 88; 56/341
See application file for complete search history.

(56) References Cited

U.S. PATENT DOCUMENTS

| | | | |
|---|---|---|---|
| 4,597,254 A | | 7/1986 | Bowden, Jr. |
| 4,625,502 A | * | 12/1986 | Gerhardt ............ A01F 15/0705 100/88 |
| 4,667,592 A | * | 5/1987 | Pentith ................ A01F 15/0705 100/77 |
| 5,365,836 A | | 11/1994 | Campbell |
| 6,729,118 B2 | * | 5/2004 | Viaud ................ A01F 15/0705 100/88 |
| 9,198,360 B2 | * | 12/2015 | Reijersen Van Buuren ................ A01F 15/071 |
| 2012/0204738 A1 | * | 8/2012 | Reijersen Van Buuren ................ A01F 15/0705 100/40 |

FOREIGN PATENT DOCUMENTS

| | | |
|---|---|---|
| EP | 1 264 532 A1 | 12/2002 |
| FR | 2 368 214 A1 | 5/1978 |
| GB | 2 111 903 A | 7/1983 |
| WO | WO 2011/053120 A1 | 5/2011 |

\* cited by examiner

CONTINUOUS BALE FORMING APPARATUS WITH A ROTATING BALE PUSHING DEVICE

CROSS REFERENCE TO RELATED APPLICATIONS

This application is a Continuation of U.S. application Ser. No. 14/395,786, filed on Oct. 20, 2014, now U.S. Pat. No. 9,198,360 which was a National Stage of PCT International Application No. PCT/NL2013/050289, filed on Apr. 19, 2013, which claims the benefit under 35 U.S.C. § 119(a) to Patent Application No. 2008667, filed in The Netherlands on Apr. 20, 2012, and Patent Application No. 2008668, filed in The Netherlands on Apr. 20, 2012, all of which are hereby expressly incorporated by reference into the present application.

BACKGROUND

The present invention relates to a bale forming apparatus and a bale forming method for forming cylindrical bales.

A bale forming apparatus as used for agricultural purposes is an agricultural vehicle to form bales of crop material. The bale forming apparatus usually comprises an intake device to take up crop material from a ground surface and a bale forming device to form a bale from the crop material.

In a known embodiment, the bale forming device comprises at least one endless pressing belt, preferably several parallel endless belts, guided by guiding rollers. An outlet of the intake device is arranged between two guiding rollers so that crop material is fed between the two guiding rollers towards the endless belt(s). Due to the feeding of crop material between the two guiding rollers a bale forming chamber is formed by the belt(s). By further feeding crop material through the outlet the bale forming chamber can be filled until a bale with a desired diameter is obtained.

The bale forming chamber is surrounded by a fixed front housing and a pivotal tailgate of the bale forming apparatus. For forming a bale under pressure the tailgate must be connected with the front housing. Opening of the pivotal tailgate ejects and thereby releases the bale from the bale forming chamber. Before ejecting a bale, this bale must be wrapped into a net or foil. Before the formation of a new bale under pressure can be started, the pivotal tailgate must be closed again.

The wrapping of the bale as well as the opening and closing of the tailgate take considerable time during which the bale forming apparatus cannot be used for formation of a new bale. This has the consequence that the intake of new crop material has to be temporarily interrupted by stopping the forward movement of the bale forming apparatus over the ground surface.

To overcome this disadvantage, several concepts for so-called continuous round balers were presented.

STATE OF THE ART

U.S. Pat. No. 4,597,254 discloses a continuous round baler. Pressing belts 68 are guided around several rollers 40, 42, 44, 46, 48, 50, 52, 54, 56, 58, 72, cf. FIG. 1. Two disks 68 are mounted on stub shafts 70 which are rotatable mounted at the two sidewalls 13. The indexing roller 72 connects the two disks 68 and has a distance to the rotating axis of the disks 68, i.e. to the stub shafts 70. Several teeth 74 at the peripheral edges of the disks 68 engage into sprockets 76 mounted on brackets 78. The sprockets 76 are connected by a cross shaft 80. One end of the shaft 80 is connected with a clutch and brake device.

Crop material is picked up by the baler of U.S. Pat. No. 4,597,254 and is conveyed through a nip between the conveyor 28 and a press roller 38. The clutch and brake device first operates as a brake and holds the disks 68 and thereby the indexing roller 72 in a home position. Between the lower span 67 of the belts 68 and the upper run 29 of the conveyor 28 a bale starting zone 69 is created. The bale increases in this bale starting zone 69 and stretches the belts 66. If the bale has reached a required diameter, the clutch and brake device operates as a clutch. The shaft 80 drives the sprocket 76 which causes the disks 68 rotating. The indexing roller 72 is moved away from the nip between the elements 28 and 38, cf. FIG. 2, on a circular path. The indexing roller 72 becomes out of engagement with the belts 66. The bale is moved away from the nip and engages partially into the tailgate 16, cf. FIG. 3 and FIG. 4. The disks 68 perform a 360 degrees rotation back into the home position. The baler starts to create a new bale.

U.S. Pat. No. 5,365,836 and EP 672340 B1 disclose a round baler 10 with a lower bale forming means (conveyor 24) and a serious of endless belts 45. The belts 45 are guided around rollers 31 to 34 mounted at the sidewalls 18 of the frame 11 and around further rollers 35 to 41 mounted at the pivotal tailgate 13. Two disks 46 are disposed parallel to the and between the sidewalls 18. An indexing member 48 has the form of a transverse roller and is mounted between the disks 46. Several teeth 50 at the peripheral edge of the disks 46 mesh with sprockets 51 which are connected with a cross shaft 53. This cross shaft 53 is connected with a clutch and brake device. The belts 45 are guided around an indexing member 48. A first baling chamber is formed above the conveyor 24 and below the belts 45. A second baling chamber is surrounded by the belts 45, cf. FIG. 1 and FIG. 2. The baler 10 operates similar to that baler described in U.S. Pat. No. 4,597,254.

The round baler 10 of U.S. Pat. No. 4,534,285 comprises a first upper bale forming apron 26. This first apron 26 is guided around several guide members 28 to 42 mounted at the base frame 12 and guided around further guide members 44, 46, 48 mounted at the rear frame 22, cf. FIG. 1. A lower apron 20 is supported by the base frame 12. A second upper bale forming apron 52 is guided around members 54 to 62 mounted at the rear frame 22. The aprons 26, 52 are formed by an endless link-type chain. The guide members 40 around which the first upper apron 26 is guided are held by a pair of arms 68. These arms 68 are pivotally mounted on a shaft 70. Hydraulic cylinders 72 can pivot the arms 68. Several rams 66 are mounted below the apron 26 and extends between the sidewalls of the base frame 12. An actuator 76 connects the rams 66 with the arms 68. The guide members 40 can move up and down in longitudinal vertical slots 74 arranged in the sidewalls.

During operation of the baler 10 of U.S. Pat. No. 4,534,285 a front bale chamber 50 is formed between the lower apron 20 and the first upper apron 26, cf. FIG. 1. The guide members 40 are in the lowermost position in the slots 74. The apron 26 and the rams 66 close the rear end of the front bale chamber 50. A bale increases in the front bale chamber 50. When the bale has reached a preset diameter, the guide members 40 are moved in the slots 74 in the uppermost position, cf. FIG. 3. This is effected by the hydraulic cylinder 72 which moves the arms 68. The connecting actuator 76 causes the rams 66 moving downwards. The apron 20 transports the bale into a rear bale chamber 64, cf. FIG. 4. This rear bale chamber 64 is formed between the upper aprons 26 and 52 and a stationary roller 65. The guide members 40 are moved downwards into an intermediate position. The actuator 76 causes the rams 66 moving upwards again. The bale further increases while being in the rear bale chamber 64, cf. FIG. 5. The creation of a further bale in the front bale chamber 50 starts. If the bale in the rear bale chamber 64 has reached the predetermined size, the guide members 40 are moved in the lowermost position, cf. FIG. 6. The bale in the rear bale chamber 64 is wrapped, cf. FIG. 7, and is ejected, cf. FIG. 8.

WO 2011/053120 A1 and US 2012/0204738 A1 disclose a round baler working in a continuous manner. An endless belt 10 is guided around four moveable guiding elements 11a, 11b, 11c, and 11d and around a fixed guiding element 12 and a tensioning element 13. The four moveable guiding elements 11a, 11b, 11c, 11d are mounted on four arms 15 which in turn are mounted on a rotatable element 16, cf. FIG. 1. Every arm 15 can be rotated by means of an actuator 16. The two moveable guiding elements 11a, 11b form a first pair. The two moveable guiding elements 11c, 11d form a second pair. Every pair can be moved into an intake position, a release position, and a back end support position. This movement is effected by rotating the arms 15 around a horizontal axis through the rotatable element 16. FIG. 1 shows the first pair with the guiding elements 11a, 11b in the intake position near the outlet 8 of an intake device. The baling chamber is formed between these two guiding elements 11a, 11b. After the bale B is created, the first pair is rotated from the intake position into a release position, cf. FIG. 2. The bale B can be ejected. Simultaneously the second pair 11c, 11d is moved into the intake position such that the creation of a second bale B2 can be started before the first bale B is ejected.

EP 1264532 A1 discloses a round baler 10 with three guiding elements 54a, 56a, 58a mounted on three arms 54, 56, 58. Every guiding element 54a, 56a, 58a comprises two rollers. A flexible belt forming means 18, e.g. several endless belts, is guided around these six rollers of the three guiding elements and around further rollers. Every arm 54, 56, 58 is formed of two parts 60, 62. These arm parts 60, 62 are hingedly connected or are connected like a telescope. The three guiding elements 54a, 56a, 58a define a main bale forming chamber 24 and an auxiliary bale forming chamber 26, cf. FIG. 5. A bale 22 is formed in the auxiliary bale forming chamber 26 defined by the guiding elements 54a and 56a, cf. FIG. 2. By rotating the arms 54, 56 the bale 22 is moved away from the intake into a transition position. The arms are further rotated and the bale 20 in the main bale forming chamber 24 reaches its full size, cf. FIG. 4. This bale 20 is wrapped while a further bale 22 is formed in the auxiliary bale forming chamber 26 which is now formed by the guiding elements 56a and 58a, cf. FIG. 5. The wrapped bale is ejected, cf. FIG. 6.

Problem, Solution

The problem solved by the invention is to provide a bale forming apparatus and a bale forming method which form cylindrical bales in a continuous manner by using a simple and reliable means for moving a bale formed in a bale forming chamber away from the intake device to a buffer means, or at least to provide an alternative bale forming apparatus and method. "Continuous manner" means: The bale forming apparatus needs not be stopped for finishing the formation of a bale, in particular not be stopped for wrapping a bale.

The problem is solved by a bale forming apparatus according to claim 1 and a bale forming method according to claim 20. Preferred embodiments are specified in the dependent claims.

The invention provides a bale forming apparatus and a bale forming method. At least two cylindrical bales are formed from material. The bale forming apparatus has the following parts and these parts are used by the bale forming method:

An intake device conveys material through an outlet into a bale forming chamber being arranged adjacent to the outlet.

This bale forming chamber is surrounded by a bale forming means.

A bale forming device forms a cylindrical bale in the bale forming chamber by using the bale forming means. The bale is afterwards pushed onto a bale supporting construction. This bale supporting construction buffers the bale until the bale is released, i.e. is ejected.

The creation of a further bale in the bale forming chamber is started. This bale forming chamber is also provided while the bale supporting construction carries a bale. The bale forming apparatus carries temporarily two bales: The "old" bale on the bale supporting construction and the "new" bale formed in the bale forming chamber.

At least one pushing member is mechanically connected with a holding device. This pushing member pushes the bale from the bale forming chamber and away from the outlet onto the bale supporting construction. For pushing the bale away from the outlet onto the bale supporting construction, the pushing member performs a movement along a circular path in the pushing direction.

The bale supporting construction carrying a bale can be pivoted from a bale receiving position into at least one further position. The bale on the bale supporting construction is pivoted away from the outlet if the bale supporting construction is pivoted from the bale receiving position into the further position.

For moving the pushing member along this circular path a drive rotates the holding device around a rotating axis in a rotating direction. This rotation causes the connected pushing member to be moved along the circular path in the pushing direction.

The bale forming means is guided by several guiding members. At least one guiding member, a pivotal guiding member, contributes at least temporally to guide the bale forming means and play a special role.

This pivotal guiding member is pivotally mounted and can be pivoted into a guiding position. This pivotal guiding member contributes to guide the bale forming means. Therefore this pivotal guiding member contributes to form a bale forming chamber adjacent to the outlet even while the bale supporting construction carries a bale.

Advantages

The invention provides a bale forming apparatus and a bale forming method which can be operated in a continuous manner, i.e. can form, wrap, and eject cylindrical bales without the need of stopping the bale forming apparatus. While the bale on the bale supporting construction is wrapped and ejected, the intake device can convey further material picked-up from the ground through the outlet and this material can be stored in the bale forming chamber provided adjacent to the outlet and—besides other—by means of the pivotal guiding member in the guiding position. As the pushing member has pivoted the old bale in the pushing direction away from the outlet, the bale forming chamber is released and can press or otherwise process this further material which is conveyed through the outlet. The formation of a new bale is started while the old bale is still on the bale supporting construction and can be finished there.

The bale supporting construction behind the bale forming chamber buffers a bale formed in the bale forming chamber until the creation of this bale is finished. It is possible to complete forming the bale while the bale is on the bale supporting construction, e.g. by wrapping the bale into a net or a foil. This completion step can be performed outside the bale forming chamber such that the bale forming chamber is released for forming a further bale. This effect is achieved as the old bale is carried by the bale supporting construction until the formation of this old bale is finished.

During this buffer step further material can be picked up and can be processed in the bale forming chamber surrounded by the bale forming means. It is not necessary to stop the bale forming apparatus for completing the bale.

According to the invention the bale supporting construction carrying a bale can be pivoted from a bale receiving position into at least one further position. Preferably the bale on the bale supporting construction is pivoted away from the outlet if the bale supporting construction is pivoted from the bale receiving position into the further position. The distance between the bale and the outlet increases such that more space adjacent to the outlet remains. This embodiment allows providing an increased bale forming chamber adjacent to the outlet. Therefore the bale forming chamber can process more material which is conveyed through the outlet while the completed bale is on the bale supporting construction. In addition larger bales can be formed by a bale forming apparatus according to this embodiment operating in a continuous manner.

According to this feature a bale is moved away from the outlet in at least two steps. In the first step the bale is pushed away from the outlet and onto the bale supporting construction being in the bale receiving position. In the consecutive second step the bale supporting construction carrying the bale is pivoted in one further position. This further position can be a bale ejecting position or an intermediate bale supporting position in which the formation of the bale is completed; e. g. a wrap is placed around the entire bale.

The old bale carried and supported by the bale supporting construction until the bale is finished and ejected. The length of the bale supporting construction and its position relative to the outlet can be adapted to given requirements, e.g. the required size of a cylindrical bale or the feeding rate with which material is conveyed through the outlet into the bale forming chamber while the old bale is on the bale supporting construction.

The invention does not require two parallel bale forming chambers. Thanks to the invention it is not necessary to provide a pre-baling chamber or a pre-pressing channel or a further pre-storage being situated upwards from the bale forming chamber, in particular no chamber or channel between the outlet of the intake device and the baling chamber. In contrast to a baler with a pre-baling chamber or a pre-pressing channel, a bale formed in the bale forming chamber is stored on the bale supporting construction before being ejected. This bale supporting construction can operate as a tailgate or can be integrated into a tailgate which can be opened for ejecting a bale. Therefore the invention provides a baler which can be implemented with a smaller length than other continuous balers. The invention can be implemented with an existing tailgate.

According to the invention a bale forming apparatus with several guiding members and a bale supporting construction is provided. It is possible to arrange the bale supporting construction sufficiently far away from the outlet of the intake device and therefore sufficiently far away from the bale forming chamber adjacent to the outlet. One effect is that an old bale on the bale supporting construction does not hamper the forming of a new bale in the bale forming chamber—even in the case that a lot of material is conveyed through the outlet in the time period between pushing the old bale away from the outlet and ejecting this bale.

According to the invention the drive rotates the holding device and the rotation of the holding device causes the pushing member to push a bale onto the bale supporting construction. Rotating the holding device is more robust than shifting a device in one direction and later in the opposite direction. In particular the rotating holding device is more stable than an oscillating piston. This feature saves a direct connection between the drive and the pushing member. The drive can be adapted to rotate the holding device regardless of the size of a bale. This is in particular of advantage as the size of a formed bale may vary from bale to bale whereas the size of the holding device is known by construction. Therefore the dimensions and the position of the drive can be adapted to the known size and position of the holding device and need not to be adapted to an unknown size of a bale. In addition the drive can be implemented at one side—or at both sides—of the bale forming chamber and only the pushing member needs to engage the bale forming chamber or be guided through the bale forming chamber.

A bale forming apparatus with the rotational holding device and the pushing member provides a robust and stable mechanism for pushing a bale onto the bale supporting construction. It is possible but not necessary to provide a drive or a positioning device for pivoting the guide mechanism with the guiding members. It suffices to rotate the holding device around the rotating axis. The holding device causes the pushing member to push the bale from the bale forming chamber onto the bale supporting construction. It is possible to arrange the drive for the holding device spaced apart from the guiding members.

The rotated holding device perform two functions: It moves the pushing member along the circular path such that the pushing member pushes a bale onto the supporting construction. In addition the holding device brings back the pushing member into a pushing start position in which the pushing member can be moved along the circular path and by this push a further bale onto the bale supporting construction. Thanks to the invention no special device for bringing back the pushing member is required.

According to the invention the pivotal guiding member is pivoted into the guiding position. Being in the guiding position the pivotal guiding member contributes to guide the bale forming means and to provide a bale forming chamber even when the bale supporting construction carries the bale. This pivotal guiding member is therefore used when the bale forming apparatus carries two bales at the same time. If the bale forming apparatus forms one bale in the bale forming chamber and carries no further bale, the pivotal guiding member may be pivoted into a parking position. In this parking position the guiding member does not inhibit the formation of the bale in the bale forming chamber.

The pivotal guiding member enables in an easy way that one segment of the bale forming means surrounds the bale forming chamber adjacent to the outlet. If the bale supporting construction is in the bale supporting position, a further segment of the bale forming means surrounds a bale on the bale supporting construction while the bale is finished. The pivotal guiding member in the guiding position defines and separates these two segments from each other. It is not necessary to provide a specific bale keeping means for keeping a bale being on the bale supporting construction and prevents the bale from falling apart. It is possible to pivot the pivotal guiding member into a parking position while no bale is on the bale supporting construction.

Embodiments

The bale forming means surrounding the bale forming chamber may comprise several pressing rollers, one endless pressing belt, several parallel endless pressing belts and/or an apron with linked chain elements. Every guiding member may comprise a roller which can rotate around a rotating axis being perpendicular to the conveying direction of the bale forming means and parallel to the rotating axis of the holding device. A guiding member can also comprise a rigid rod.

According to the invention the bale forming apparatus temporally carries two bales: One bale being pushed on the bale supporting construction and one further bale increasing in the bale forming chamber adjacent to the outlet. Preferably the bale forming member surrounds the bale forming chamber adjacent to the outlet as well as the bale pushed onto the bale supporting construction. This embodiment enables to wrap or otherwise finish the bale on the bale supporting construction while the bale is surrounded by a bale forming means and without the need of providing a specific bale keeping device for the bale on the bale supporting construction.

In one embodiment the rotated pushing member pushes a bale which is surrounded by the bale forming means. The bale remains surrounded by the bale forming means while being shifted onto the bale supporting construction and while being supported by the bale supporting construction. One segment of the bale forming means surrounds this bale on the bale supporting construction. A further segment surrounds the bale forming chamber adjacent to the outlet in which a new bale is formed. This embodiment saves two different bale forming means as well as save a specific bale surrounding means for the bale on the bale supporting construction.

According to the invention the drive rotates the holding device around the rotating axis. This causes the pushing member to be moved along a circular path in a pushing direction. This pushing direction may change over time as the pushing member is also rotated around the rotating axis of the holding device. Preferably the pushing direction is nevertheless always perpendicular to the rotating axis of the holding device.

Preferably the bale forming apparatus is adapted such that rotating the holding device around the rotating axis and thereby rotating the pushing member in the pushing direction triggers the step that the pivotal guiding member is pivoted into the guiding position. This pivoting step can be enforced by a suitable mechanical connection between
 the holding device or the drive of the holding device and the pivotal guiding member and/or
 a suitable guiding element for the pivotal guiding member, e. g. a suitable slot.

This embodiment increases the reliability that a bale forming chamber adjacent to the outlet is also performed when a bale is on the bale supporting construction.

In one embodiment the holding device moves the pushing member along a circular path of movement which guides the pushing member temporally between the outlet and the bale forming chamber. The movement path intersects the path along which the material is conveyed into the bale forming chamber while the pushing member is between the outlet and the bale forming chamber. The pivotal guiding member might also be moved into the path of the material. No material can be conveyed into the bale forming chamber for a short period due to the current position of the pushing member or the pivotal guiding member. One embodiment solves this problem as follows: The intake device comprises a feeding channel with a pivotally mounted feeding channel bottom. The feeding channel leads to the outlet. The bottom can be lowered down such that the capacity of the intake device is increased. Material can be buffered in this enlarged intake device until the pushing member has passed the outlet. A resilient means, e.g. a spring, pivots the bottom back into the standard position. The channel bottom is lowered downwards against the force of this resilient means.

In one embodiment the holding device is rigidly connected with the or with every pushing member and is pivotally connected with the pivotal guiding member. Preferably at least one guiding member arm is pivotally connected with the holding device and with the pivotal guiding member. In one embodiment two guiding member arms for the same pivotal guiding member are arranged such that the outlet to the bale forming chamber is situated between these two arms when the pivotal guiding member is shifted or pivoted along the outlet. The connection point (in general a pivoting axis) in which the guiding member arm is connected with the holding device is preferably spaced away from the rotating axis of the holding device such that a lever arm between the connection point and the rotating axis is provided. This lever arm urges onto the guiding member arm. Rotating the holding device around its rotating axis pushes or pulls the pivotal guiding member into the guiding position and later also away from the guiding position. Rotating the holding device in the rotating direction around the rotating axis therefore causes
 the pushing member to be rotated on the circular path as well as
 the pivotal guiding member to be pivoted into the guiding position.

The pivotal guiding member in the guiding position contributes to provide a bale forming chamber. Thanks to this embodiment it is possible to provide a pivotal guiding member which is only in the guiding position when required for forming a new bale while the old bale is on the bale supporting construction. After the old bale is ejected, the pivotal guiding member is pivoted into a parking position.

Thanks to the embodiment with the guiding member arm(s) connected with the holding device no active drive for pivoting the pivotal guiding member is required. In contrast the holding device itself moves the pivotal guiding member into the guiding position. Therefore the holding device of this embodiment has two functions:
 moving the pushing member and
 pivoting the pivotal guiding member.

Preferably this embodiment is combined with a further embodiment. The pivotal guiding member is guided in at least one longitudinal slot into the guiding position and into a parking position. This embodiment (guiding member arm and longitudinal slot) enables a purely passive and easy pivoting mechanism for the pivotal guiding member which is robust.

Preferably the pivotal guiding member being in the guiding position is arranged between the outlet and the bale supporting construction. By this embodiment the pivotal guiding member or the bale forming means guiding by the pivotal guiding member inhibits loose material to pass from the bale forming chamber onto the bale supporting construction.

In addition this embodiment separates the bale forming means into two segments. Each segment limited by the pivotal guiding member in the guiding position. One segment surrounds the bale forming chamber adjacent to the outlet for forming a new bale. The other segment surrounds the old bale on the bale supporting construction.

Preferably the bale forming apparatus comprises two pushing members which both are connected with the same holding device. Rotating the holding device causes every pushing member to be moved along a circular path. One pushing member pushes the bale onto the bale supporting construction. The other pushing member is currently in a parking position. Rotating the holding device causes the one pushing member to push the bale onto the bale supporting construction and the other pushing member to be moved towards the outlet such that the other pushing member pushes the next bale onto the bale supporting construction. This embodiment requires less rotational movement of the holding device between pushing a first bale and pushing a second bale as the first bale is pushed by the first pushing member and the second bale is pushed by the second pushing member. In one embodiment every pushing member is rotated around 180 degrees per bale whereas an embodiment with only one pushing member requires a rotation of 360 degrees per bale.

In one embodiment these two pushing members are connected with the holding device such that the rotating axis of the holding device is arranged between these two pushing members and the two pushing members have the same distance to the rotation axis. In other words: If the holding device is rotated about 180 degrees around the rotating axis, the one pushing members takes the position of the other guiding member. It is possible to provide three or more pushing members. Three pushing members only require a rotation of 360/3=120 degrees per bale. The number of pushing members may be limited by the space required for a bale in the bale forming chamber.

Preferably the bale forming apparatus comprises two pivotal guiding members. One pivotal guiding member is in the guiding position and contributes to form the bale forming chamber if a bale is on the bale supporting construction. The other pivotal guiding member is currently in a parking position. If no bale is on the bale supporting construction, both pivotal guiding members maybe in the parking position. This embodiment with two pivotal guiding members is preferably combined with an embodiment in which the holding device pivots a pivotal guiding member into the guiding position. This embodiment again requires less movement of the holding device. The two pivotal guiding members can be connected with the holding device by means of four guiding member arms which are connected with the holding device in four connection points spaced apart from the pivoting axis.

In one embodiment the holding device comprises a lever arm for the pushing member. The drive rotates this lever arm around the rotating axis. It is possible to provide at least two guiding members and one lever arm per guiding member.

In a preferred embodiment the holding device comprises at least one disk, preferably two parallel disks or two other flat objects. The term "parallel" means: The disks extend in two parallel planes. The two disks are preferably connected by a rigid axle where the axle can rotate around the rotating axis of the holding device. This rotation axis is the symmetrical axis of this axle. The pushing member—or the two pushing members—are mechanically connected with these two disks and extends between these two disks. Preferably the pushing members can rotate around their own rotational axis but cannot move with respect to the holding device. This embodiment with the two parallel disks provides a very robust construction. For reducing the weight apertures may be inserted into the disks.

The drive is preferably arranged such that the disk is arranged between the pushing member and the bale forming chamber on the one side and the drive on the other side. Therefore the disk protects the drive. Preferably the drive can mechanically be connected or is connected with a disk or with both disks. The axle is an idler axle and is not directly driven by the drive but is rotated by the rotating disk or rotating disks. This embodiment saves a driven shaft for rotating the holding device.

Preferably a further guiding member contributes at least temporally to guide the bale forming means. It is possible that this further guiding member is pivoted into a guiding position and into a parking position and that the further guiding member guides the bale forming means only when being in the guiding position. In one embodiment this further guiding member is mounted at a free end of the pivotal bale supporting construction.

This further guiding member is mechanically connected with the holding device or with the pushing member such that the following effect is achieved: Rotating the pushing member along the circular path and in the pushing direction causes the further guiding member to be pivoted away from this circular path. Preferably the further guiding member is pivoted downwards and by this away from the circular path. This pivotal movement away from the circular path avoids a collision between the pushing member and the further guiding member being pivoted in the pushing direction. This embodiment allows implementing a shorter baler. In one embodiment the further guiding member is also guided in at least one longitudinal slot.

In one embodiment the pushing member is temporally connected with the pivotal guiding member while the pushing member performs the movement along the circular path. The pivotal guiding member follows the pushing member on its circular path as long as the pivotal guiding member is connected with the pushing member. The holding device is rotated and moves the pushing member along the circular path. The pushing member pulls the pivotal guiding member.

In one embodiment the pushing member is mounted on a free end of a supporting arm being part of the holding device and the pivotal guiding member can be connected with this supporting arm.

The connection between pushing member and pivotal guiding member is preferably established by means of a locking device being in a locking position. This locking device is later pivoted from the locking position into a releasing position while the pushing member performs the movement along the circular path or after the pushing member has completed this movement and has pushed the bale away from the outlet onto the bale supporting construction. The locking device in the releasing position does no longer connect the pivotal guiding member with the pushing member. After being released the pivotal guiding member is pivoted away from the pushing member and into the guiding position. Preferably the pivotal guiding member is pivoted with respect to the pushing member opposite to the pushing direction.

The embodiment with the pivotal guiding member connected with the pushing member provides a simple mechanism to move the pivotal guiding member without the need of establishing an active drive especially for the pivotal guiding member. If the bale forming apparatus comprises two pairs wherein each pair comprises a pushing member and a pivotal guiding member, every pair preferably further comprises an own pivotal locking device for locking the pushing member and the guiding member of the pair.

In one embodiment the drive for the holding device comprises a pivotal actuator arm. The actuator arm can be pivoted around the rotating axis of the holding device or around another axis. A linear actuator is adapted for moving this actuator arm in a pivoting movement. Preferably the holding device can be connected with the actuator arm by means of a coupling device such that the actuator arm can be coupled or decoupled. This embodiment enables the actuator arm to be driven in a swinging or oscillating motion. When the actuator arm is moved in the rotating direction the arm is coupled with the holding device in a coupling location and rotates the holding device. During a movement of the actuator arm in the opposite direction the arm is not coupled with the holding device such that the arm is moved to a new coupling location.

In this embodiment the holding device has several coupling locations for coupling the actuator arm. Only the actuator arm has to be connected with the holding device. The linear actuator is connected or can be connected with the actuator arm. This embodiment enables to provide a holding device which is greater than the length of the actuator arm and the length of the linear actuator. A stroke performed by the linear actuator can be smaller than the size of the holding device.

In one embodiment the different coupling locations are implemented by means of a number of pins distributed over the circumference of the holding device. The actuator arm is connected with a coupling element which can engage such a pin. This embodiment can in particular be combined with the embodiment where the holding device comprises two parallel supporting disks. The actuator arm can be coupled with every one of these pins. Preferably the actuator arm is biased into a coupling position such that the actuator arm couples the coupling pin when being moved in the rotating direction. The actuator arm uncouples from the pin when being moved in the other direction. Any other embodiment to selectively coupling the actuator arm can also be applied.

According to the invention the bale supporting construction carrying a bale can be pivoted from a bale receiving position into at least one further position. According to this feature a bale is moved away from the outlet in at least two steps. In the first step the bale is pushed away from the outlet and onto the bale supporting construction being in the bale receiving position. In the consecutive second step the bale supporting construction carrying the bale is pivoted in one further position.

Preferably the first step comprises an approximately linear movement of the bale supporting construction away from the outlet. The consecutive second step comprises a pivotal movement of the bale supporting construction upwards and around an approximately horizontal pivoting axis.

In one embodiment the bale supporting construction can be pivoted into a bale receiving position, from the bale receiving position into a bale supporting position and from the bale supporting position into the bale ejecting position. The pushing member pushes a bale onto the bale supporting construction being in the bale receiving position. A first pivoting mechanism pivots the bale supporting construction carrying this bale from the bale receiving position into the bale supporting construction. A second pivoting mechanism pivots the bale supporting construction carrying this bale from the bale supporting position into the bale ejecting position. It is possible that the same part of the bale forming apparatus operates as a first pivoting mechanism as well as the second pivoting mechanism. But preferably two different mechanisms are provided as the first pivotal movement has a characteristic different from the second pivotal movement. During the first pivotal movement the bale is shifted in a substantially horizontal direction away from the outlet, e.g. by rotating a carrying member for the bale around a horizontal rotating axis. As a result of the second pivotal movement the bale should be ejected by force of gravity. Therefore the carrying member has to be brought into an orientation in which the bale roles off or drops from the carrying member when the second pivotal movement is performed.

In one embodiment the bale forming apparatus comprises a wrapping device which is arranged such that the bale forming chamber is between the outlet and the wrapping device. Preferably the wrapping device is connected with the bale supporting construction. The embodiment with the wrapping device behind the bale forming chamber enables the wrapping device to inject wrapping material into the bale forming chamber as early as possible, even before the bale is pushed onto the bale supporting construction. The bale is pushed before the wrapping material reaches the outlet.

In one embodiment the bale forming apparatus is moved over ground. A pick-up unit picks up material from the ground and conveys the material to the intake device. This application is in particular used for forming cylindrical bales from agricultural material (hay, straw, silage, e.g.). The bale forming apparatus may be a self-propelled vehicle or is pulled by a tractor.

In a further embodiment the bale forming apparatus operates as a stationary plant. Material is fed to the intake device. This application is in particular used for compacting recycling material, e.g. paper or card board or plastic material.

DESCRIPTION OF EMBODIMENT

In the following an embodiment of the invention is described by means of the following figures.

Figure 7:
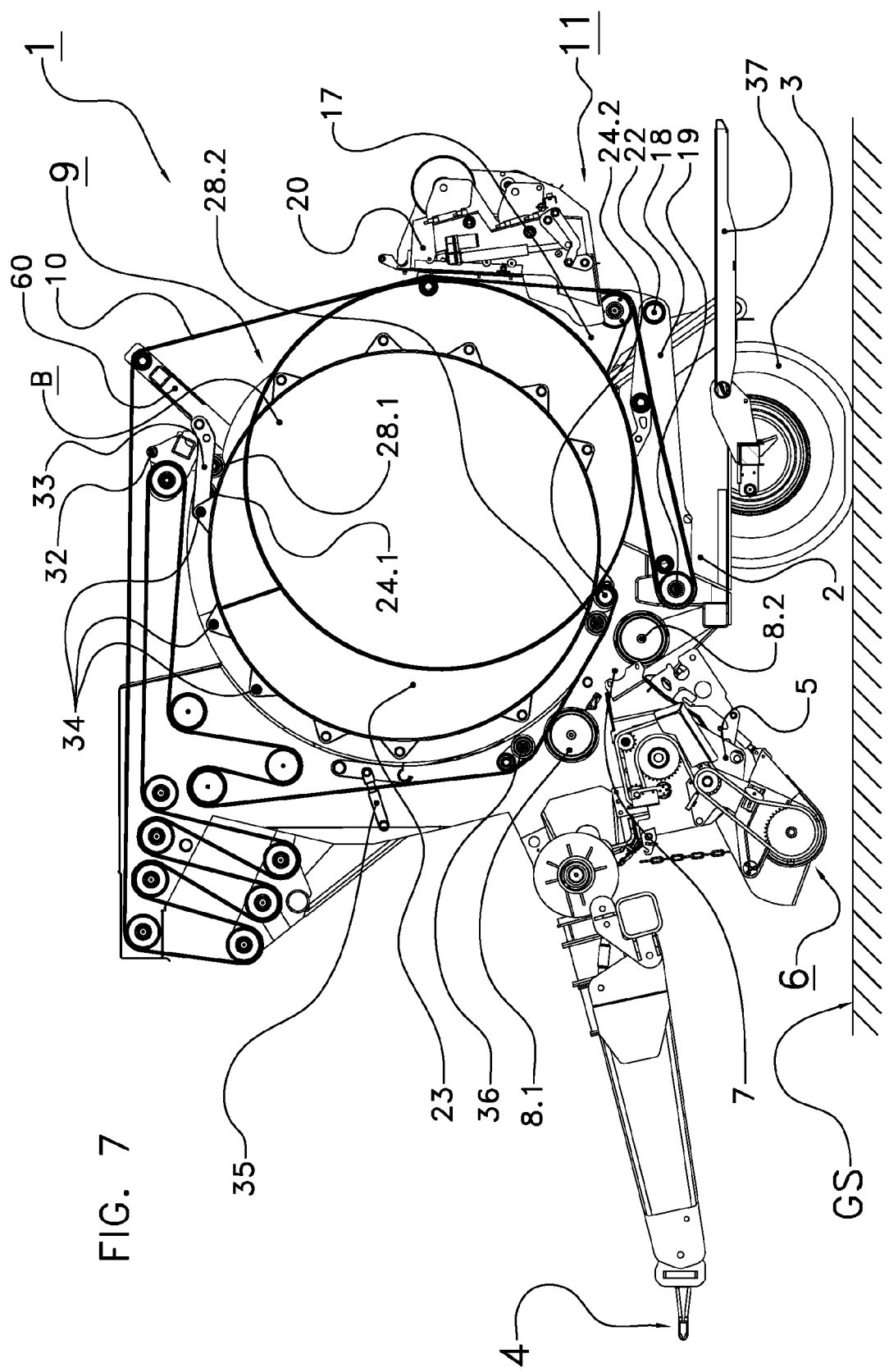
FIG. 7 shows the bale forming apparatus of FIG. 6 with the tailgate bottom roller being lowered down away from the circular path and the bale supporting construction still in the bale receiving position.
Figure 8:
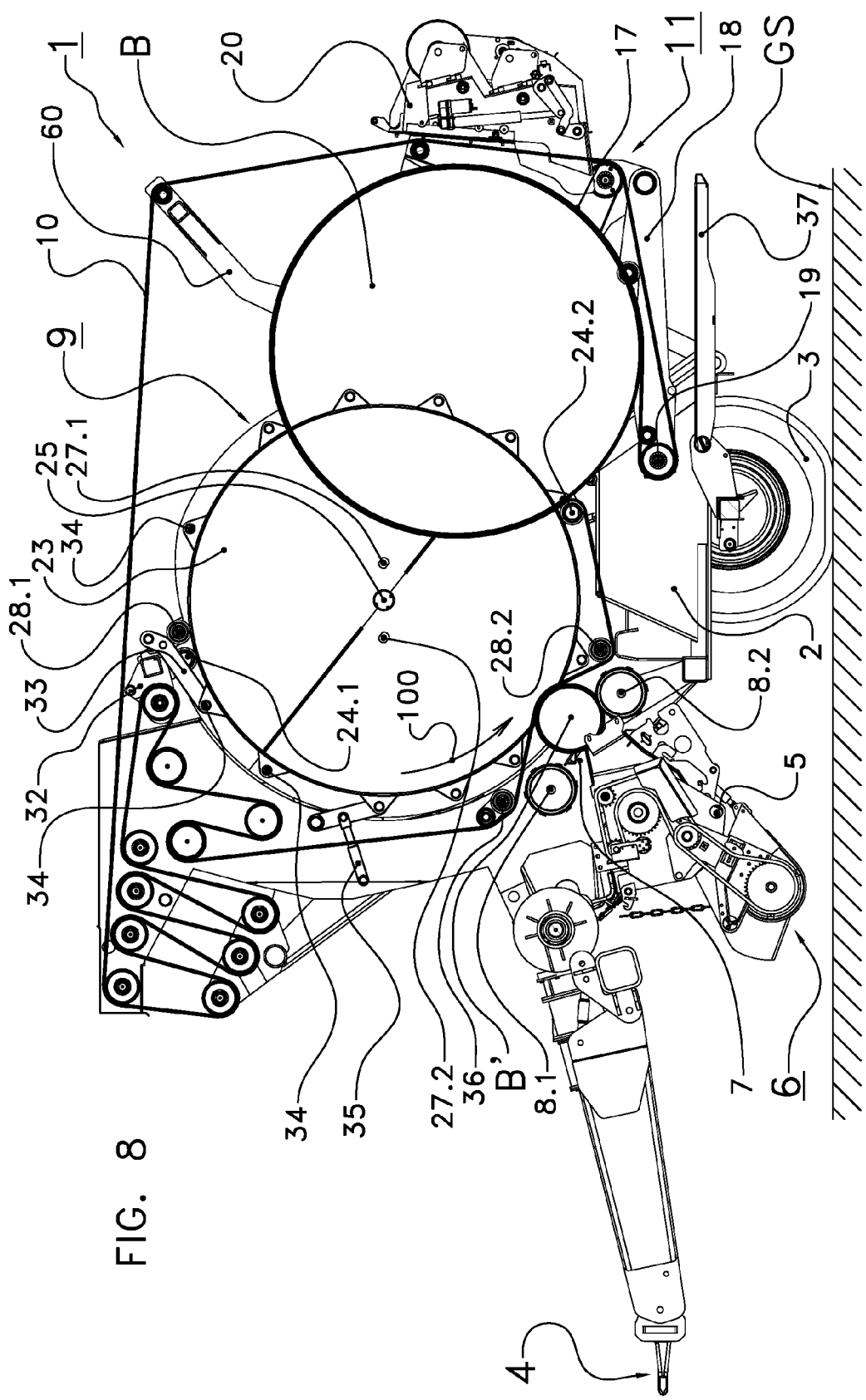
Figure 9:
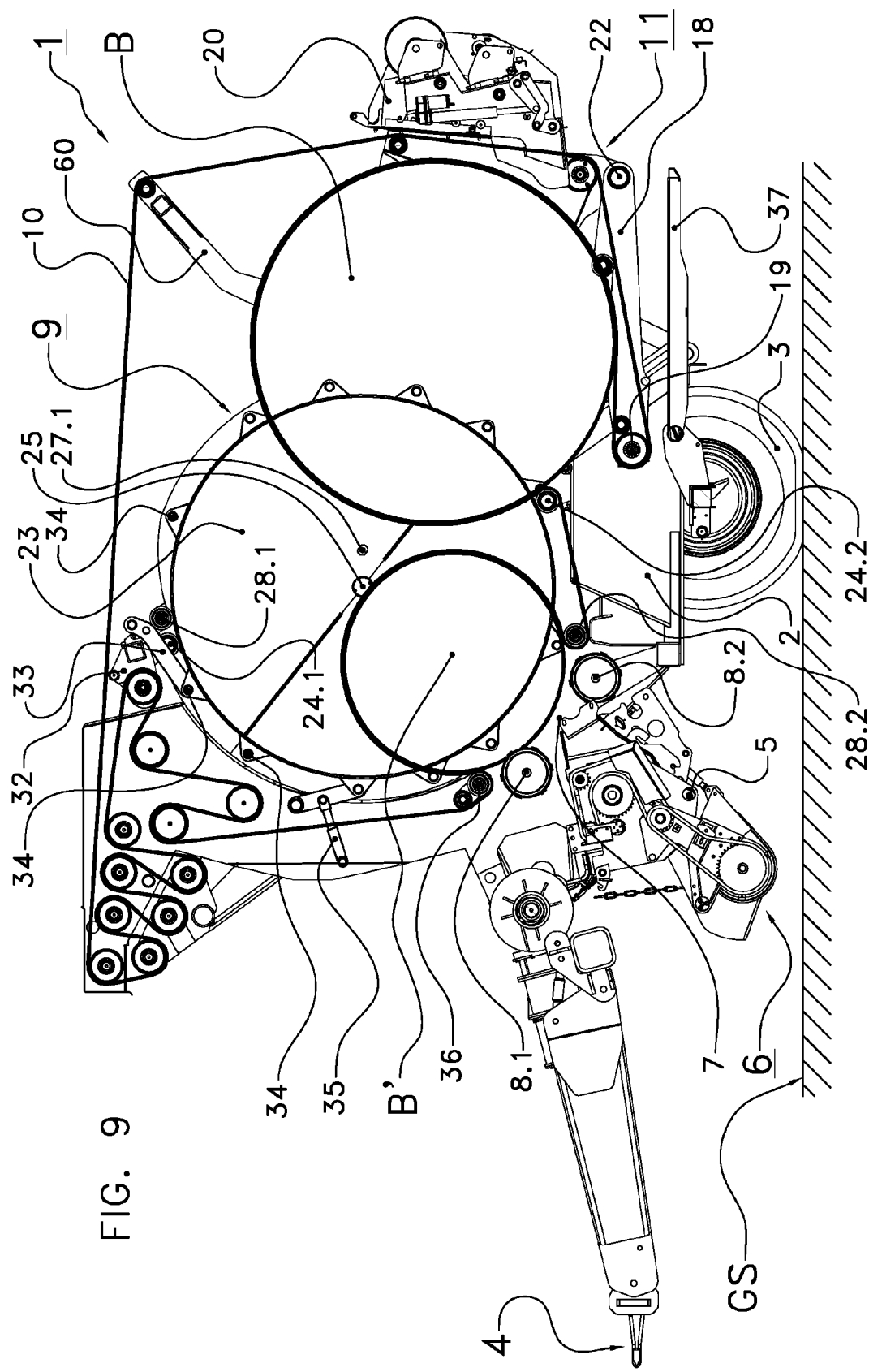
Figure 10:
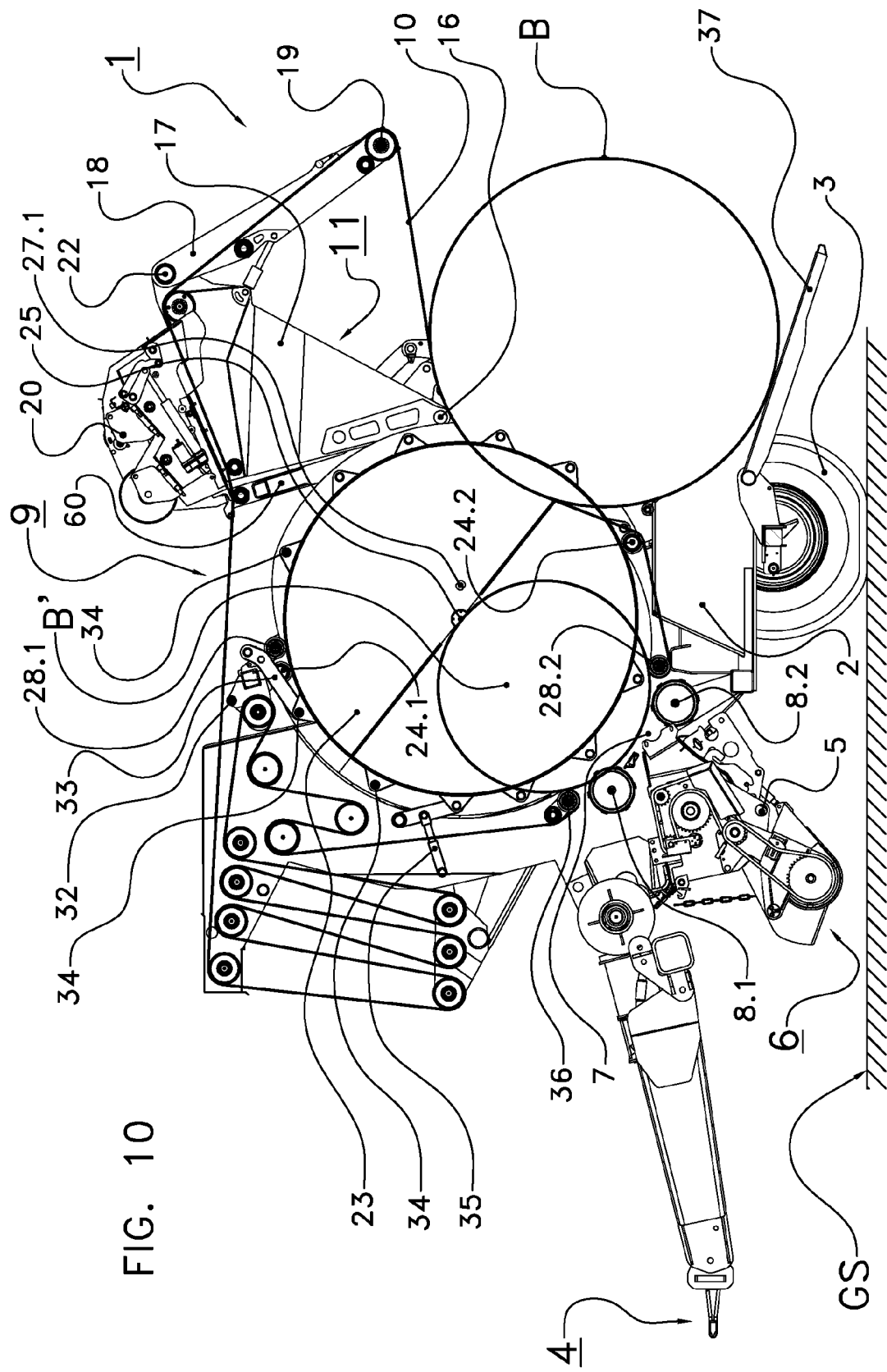
Figure 11:
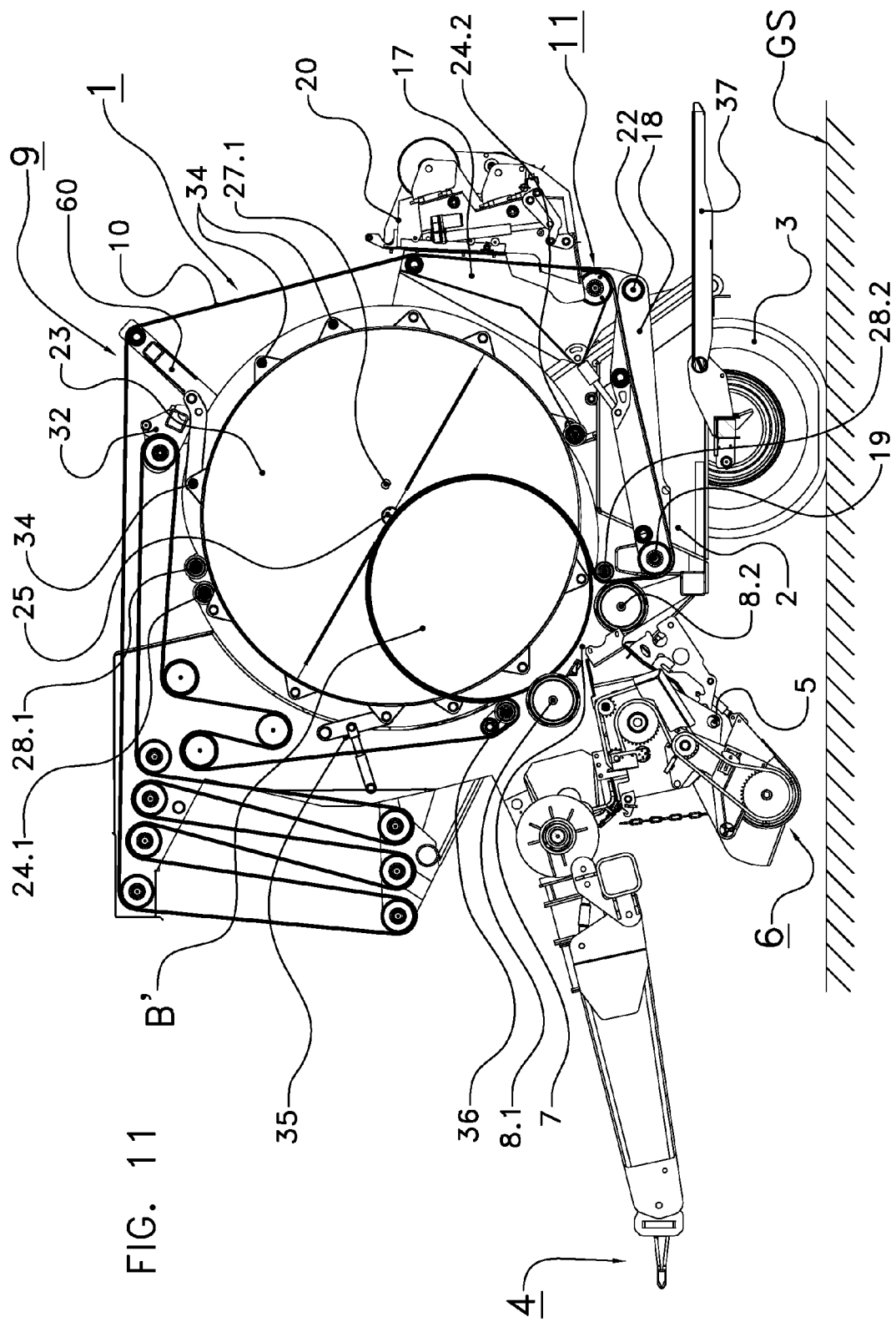
Figure 12:
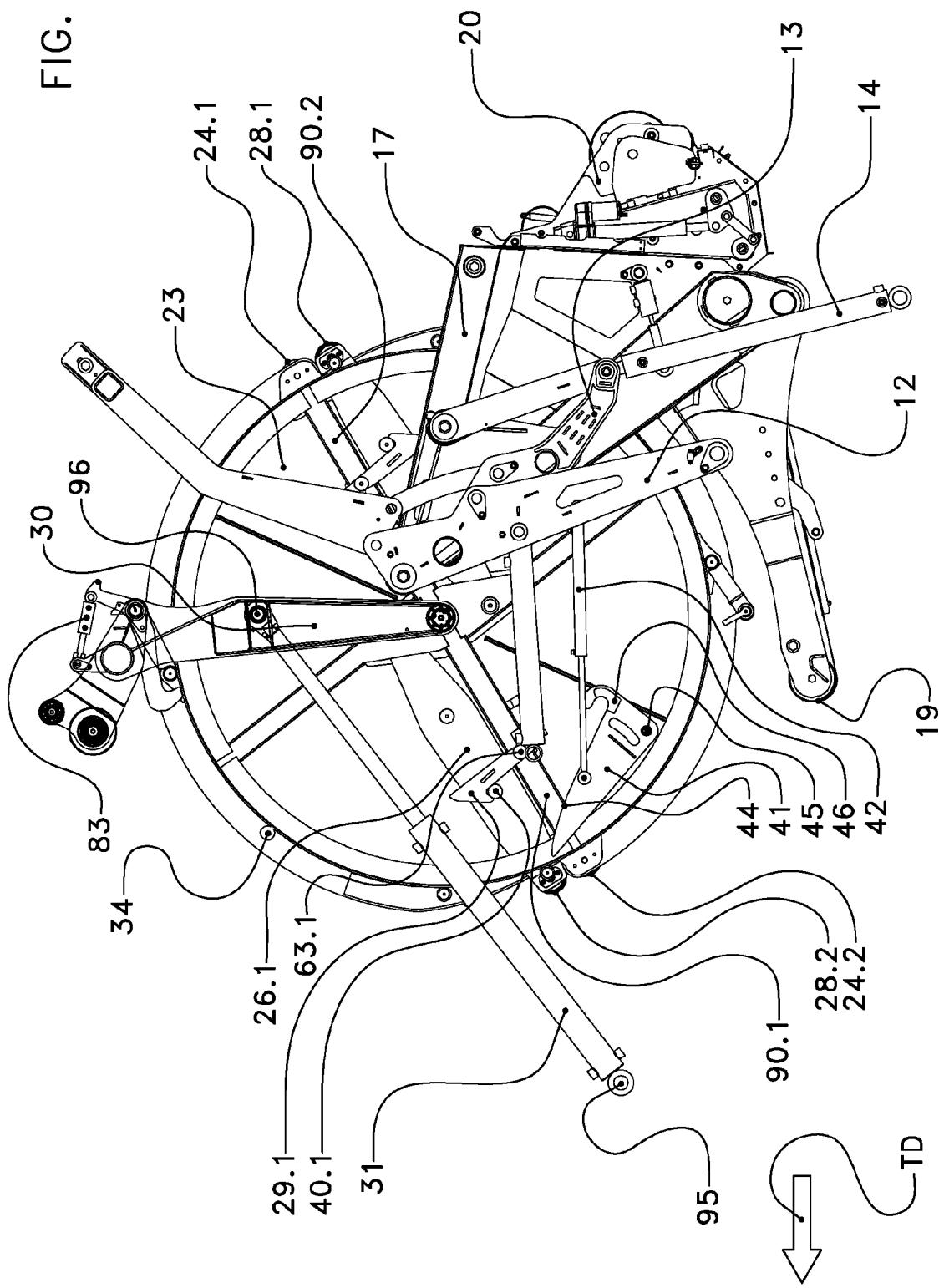
Figure 13:
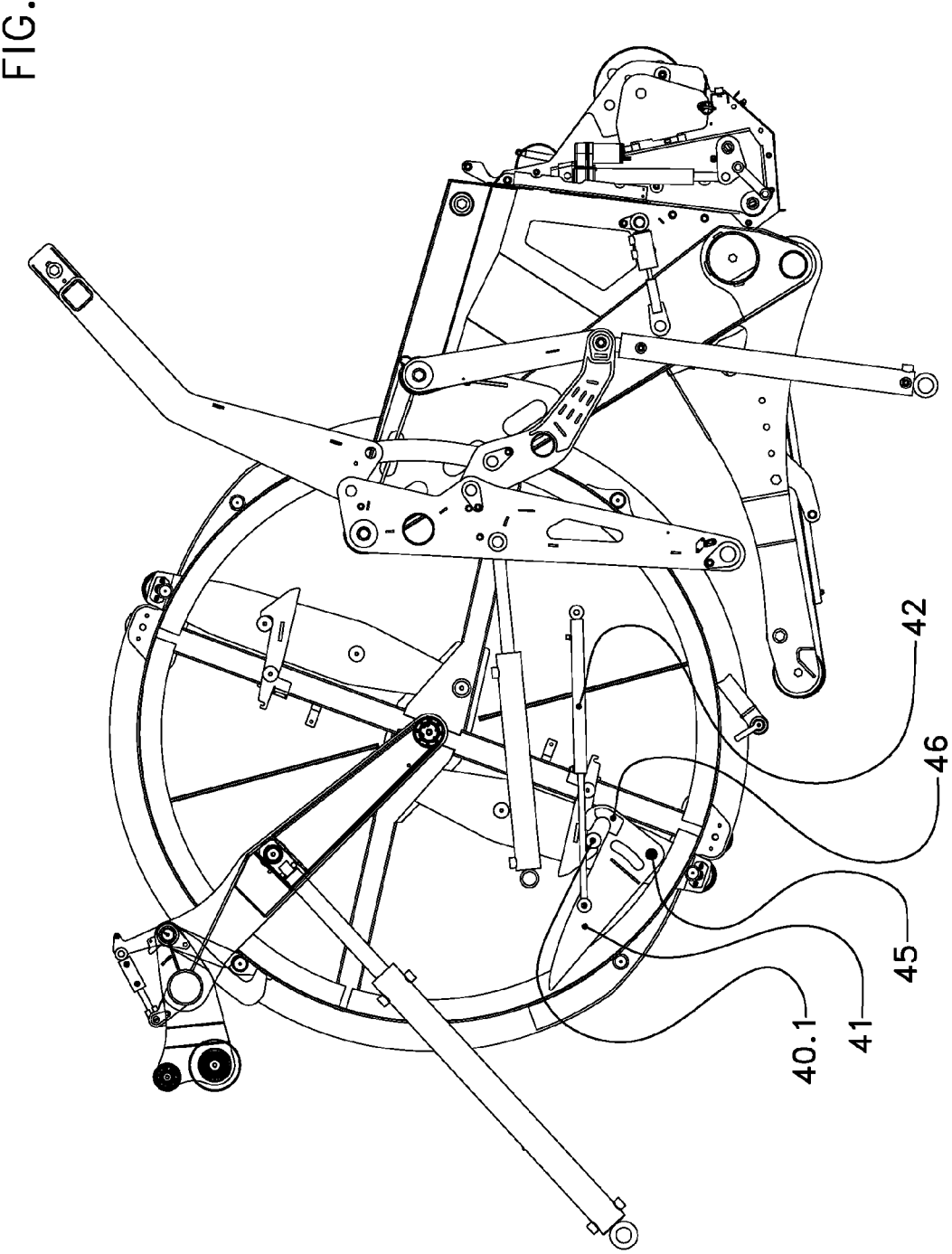
Figure 14:
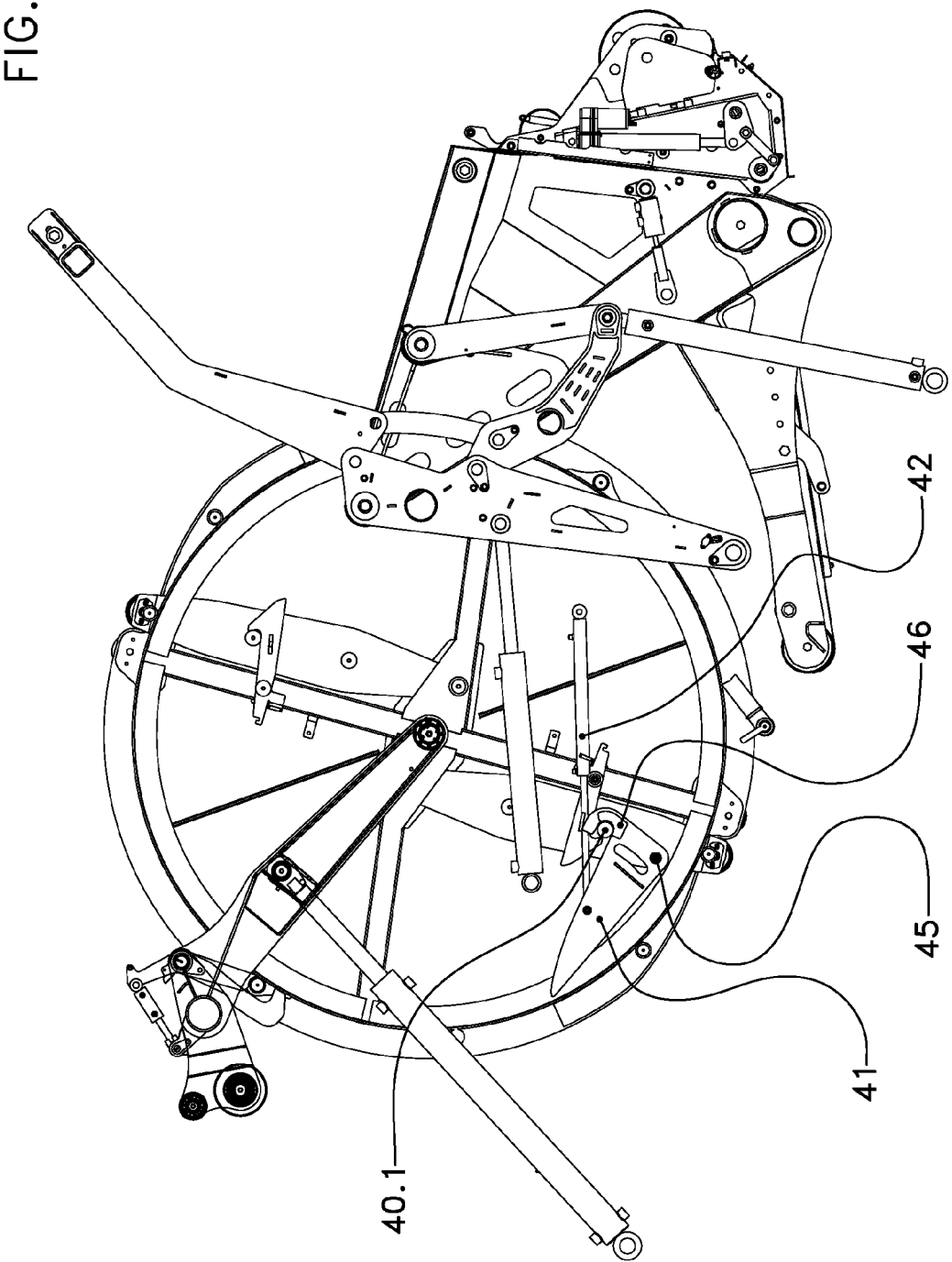
Figure 15:
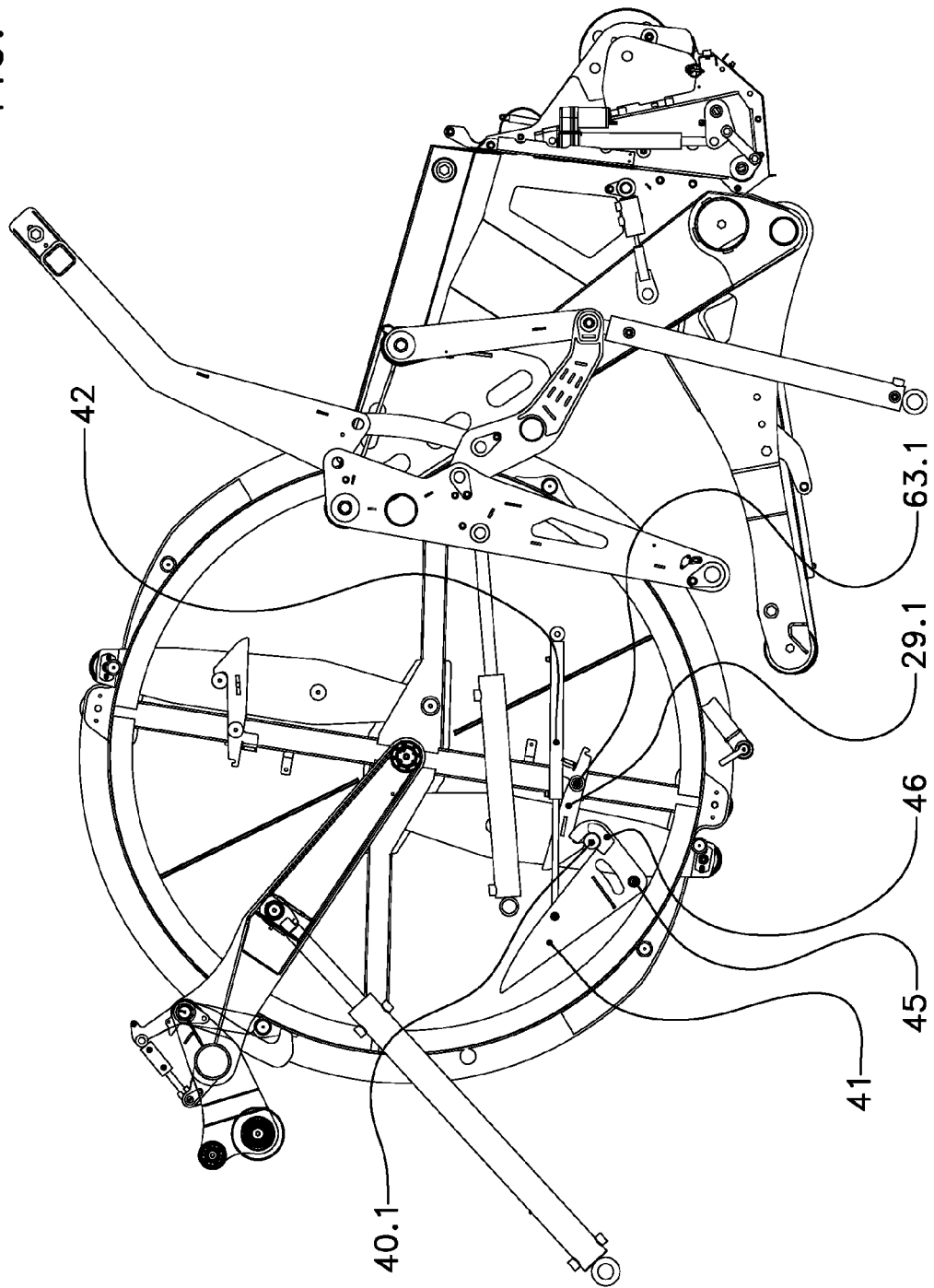
Figure 16:
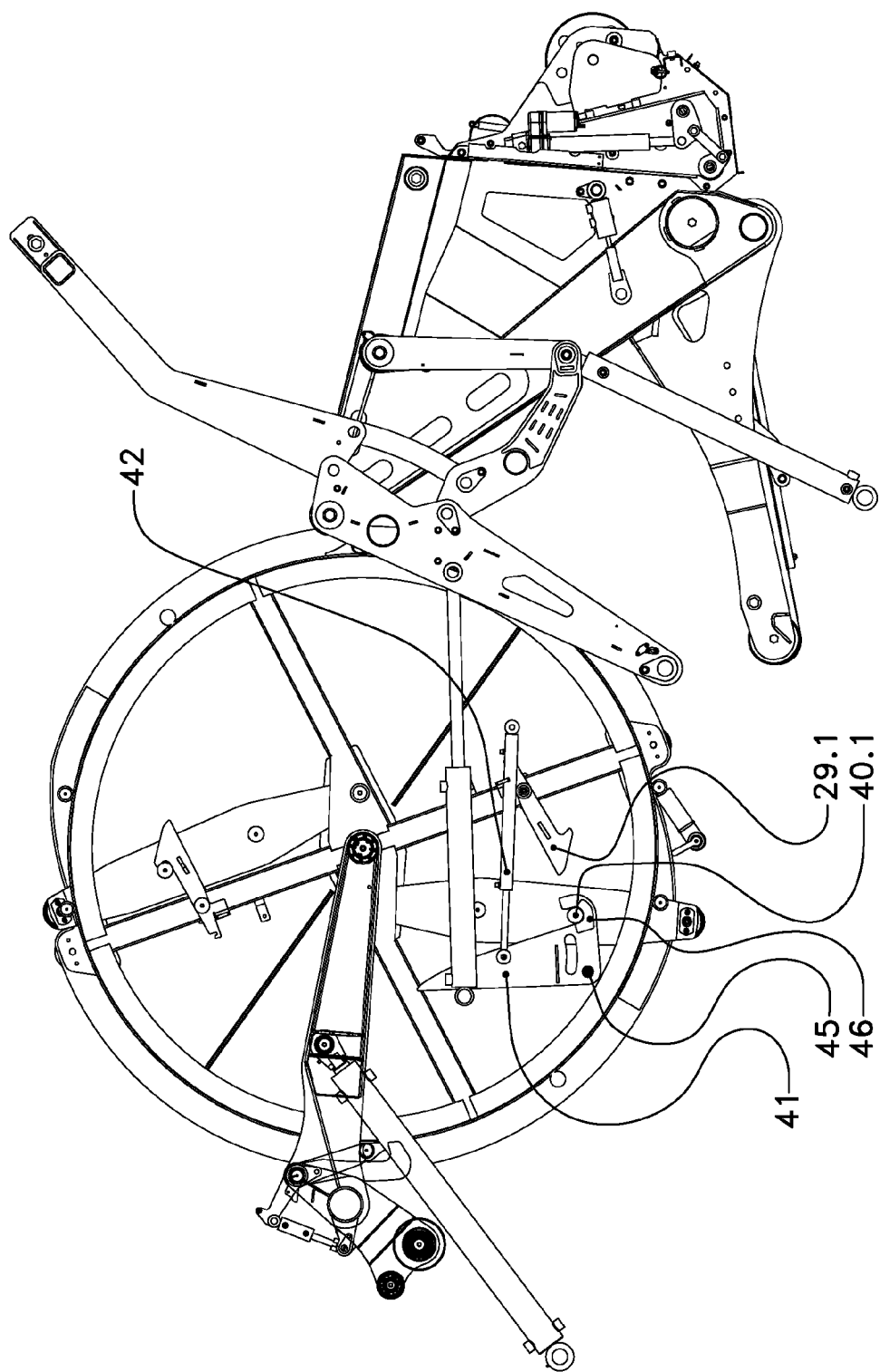
Figure 17:
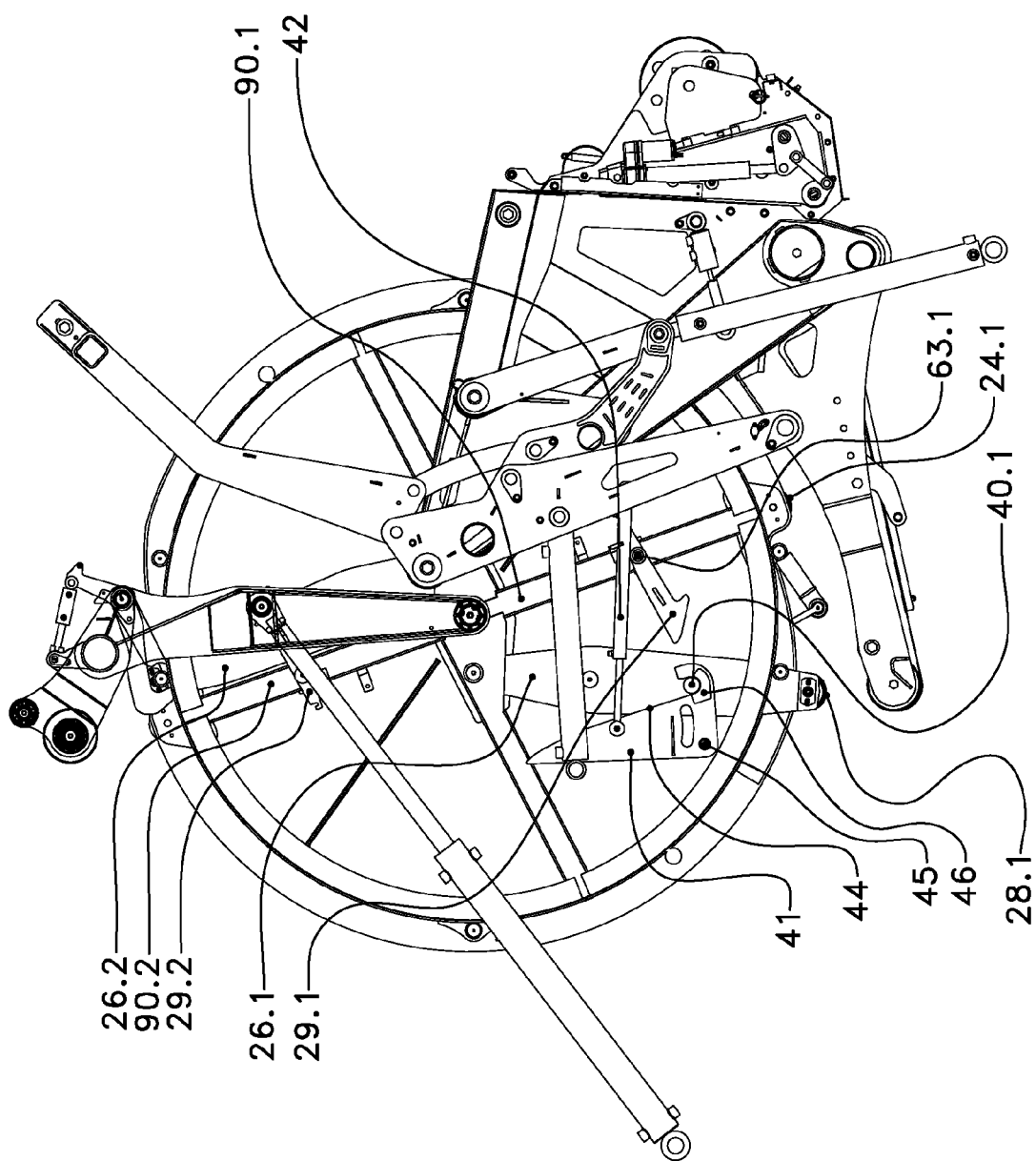
Figure 18:
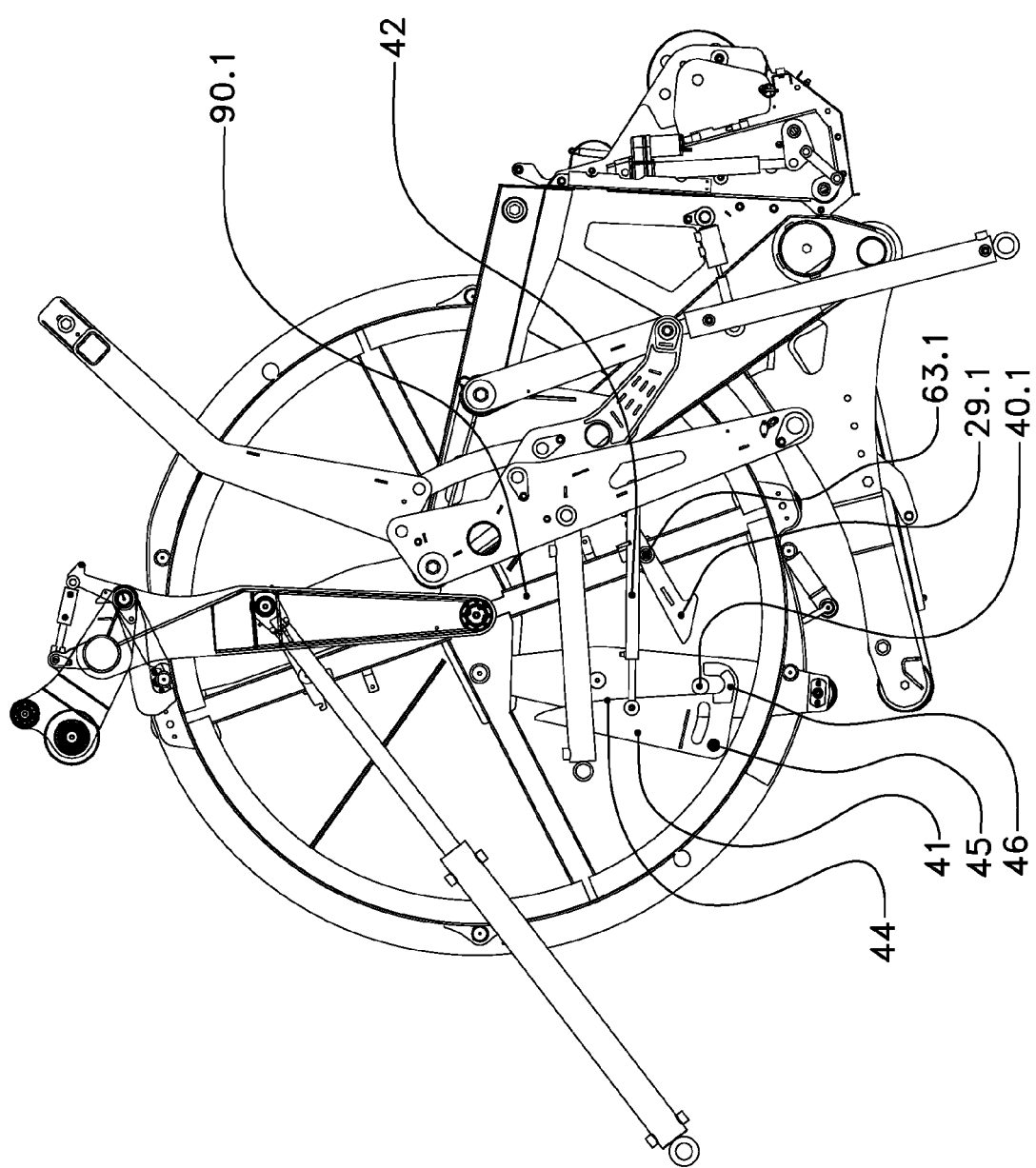
Figure 19:
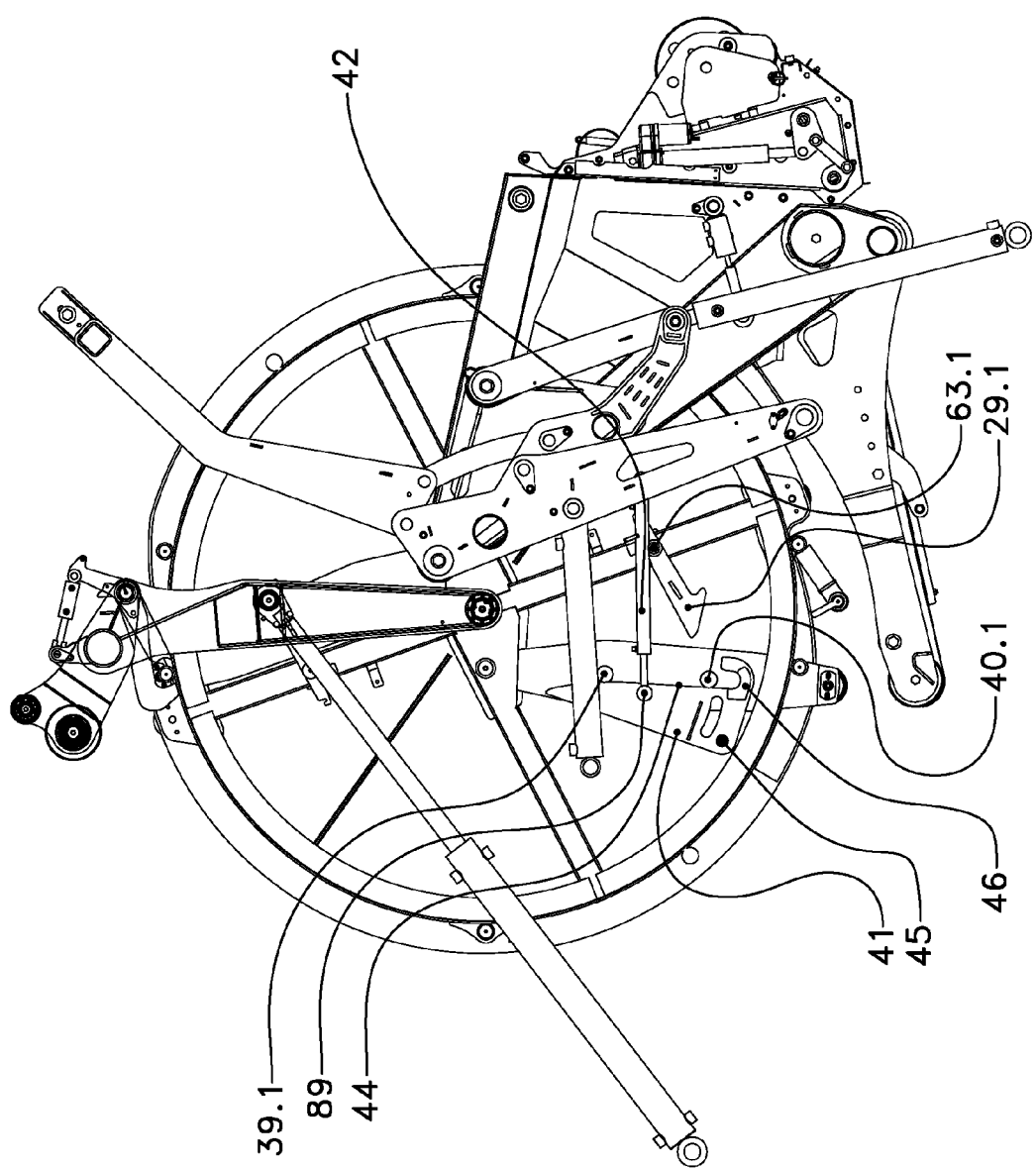
Figure 20:
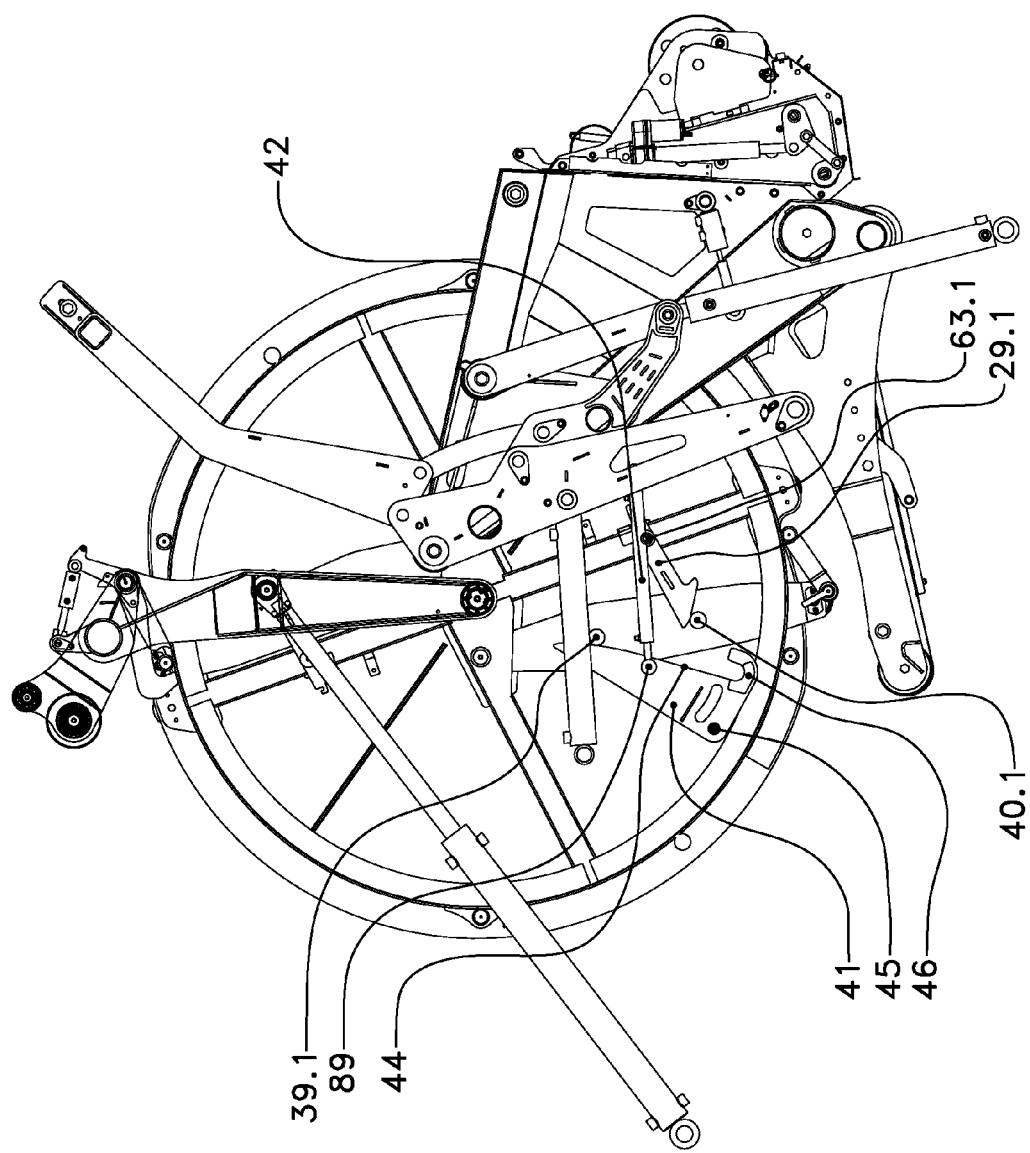
Figure 21:
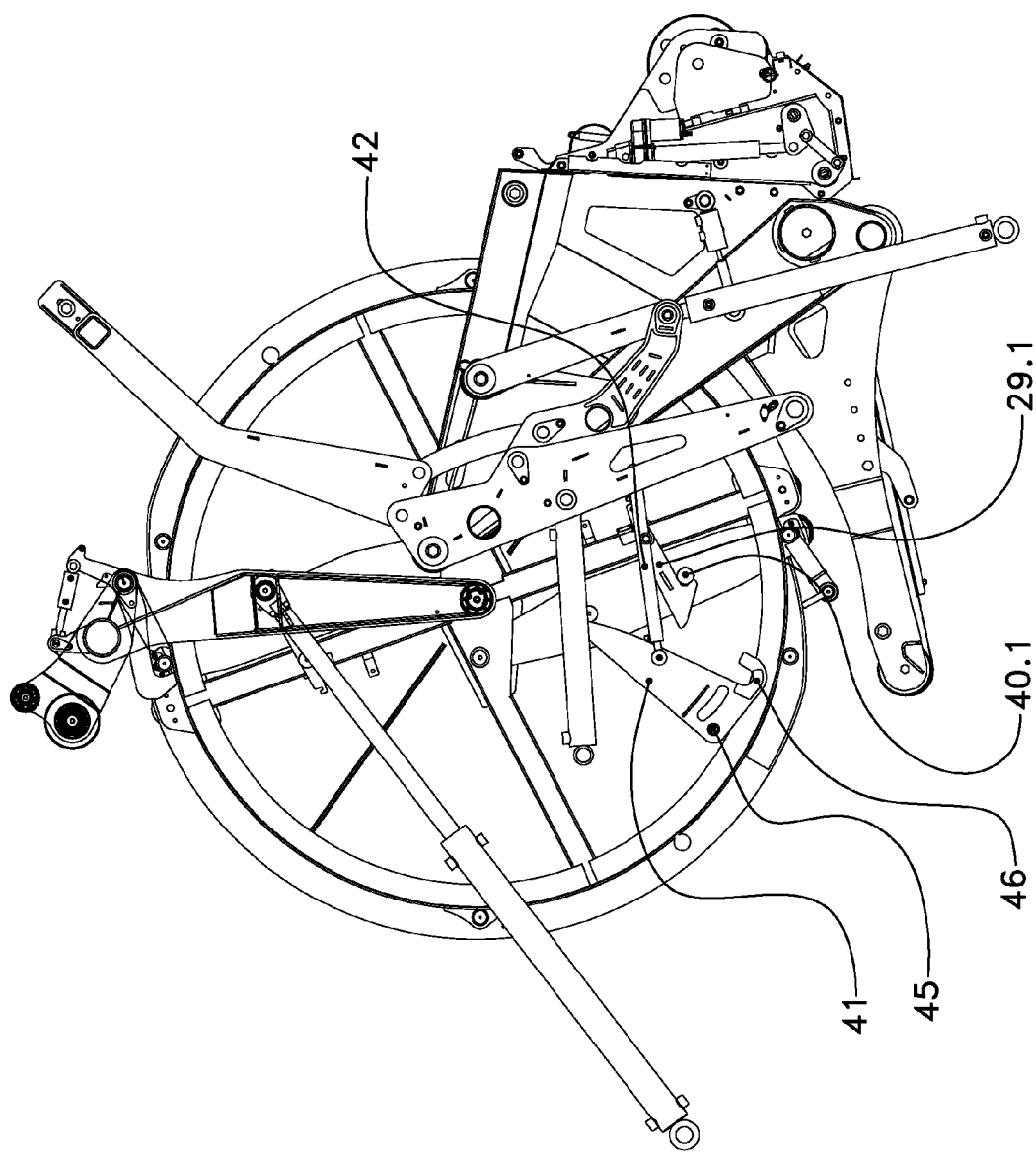

FIG. 8 shows the bale forming apparatus of FIG. 7 with the pivotal guiding roller being disconnected from the pushing roller and moved away from the pushing roller into the guiding position and the pushing roller being rotated into the pushing end position and the bale supporting construction in the bale supporting position and the pivotal guiding roller in the guiding position contributing to form a bale forming chamber in which the formation of a new bale in the bale forming chamber adjacent to the outlet starts;

FIG. 9 shows the bale forming apparatus of FIG. 8 with the new bale increasing and the old bale still on the bale supporting construction being in the bale supporting position;

FIG. 10 shows the bale forming apparatus of FIG. 9 with the bale supporting construction in the bale ejecting position releasing the old bale;

FIG. 11 shows the bale forming apparatus of FIG. 10 after having ejected the bale and the bale supporting construction nearly being pivoted back into the bale receiving position;

FIG. 12 shows in more detail the pushing roller and the pivotal guiding roller being locked together by the locking hook before pushing a bale;

FIG. 13 shows the baler of FIG. 12 after having pushed the bale, the pushing roller and the pivotal guiding roller still being locked with each other;

FIG. 14 to FIG. 16 show the process of pivoting the pivotal guiding roller into the guiding position and releasing it from the pushing roller and of pivoting the tailgate into the bale supporting position;

FIG. 17 to FIG. 21 show the process of pivoting the pivotal guiding roller back into the pushing position and connecting it with the pushing roller while the bale supporting construction is in the bale receiving position.

Figure 1:
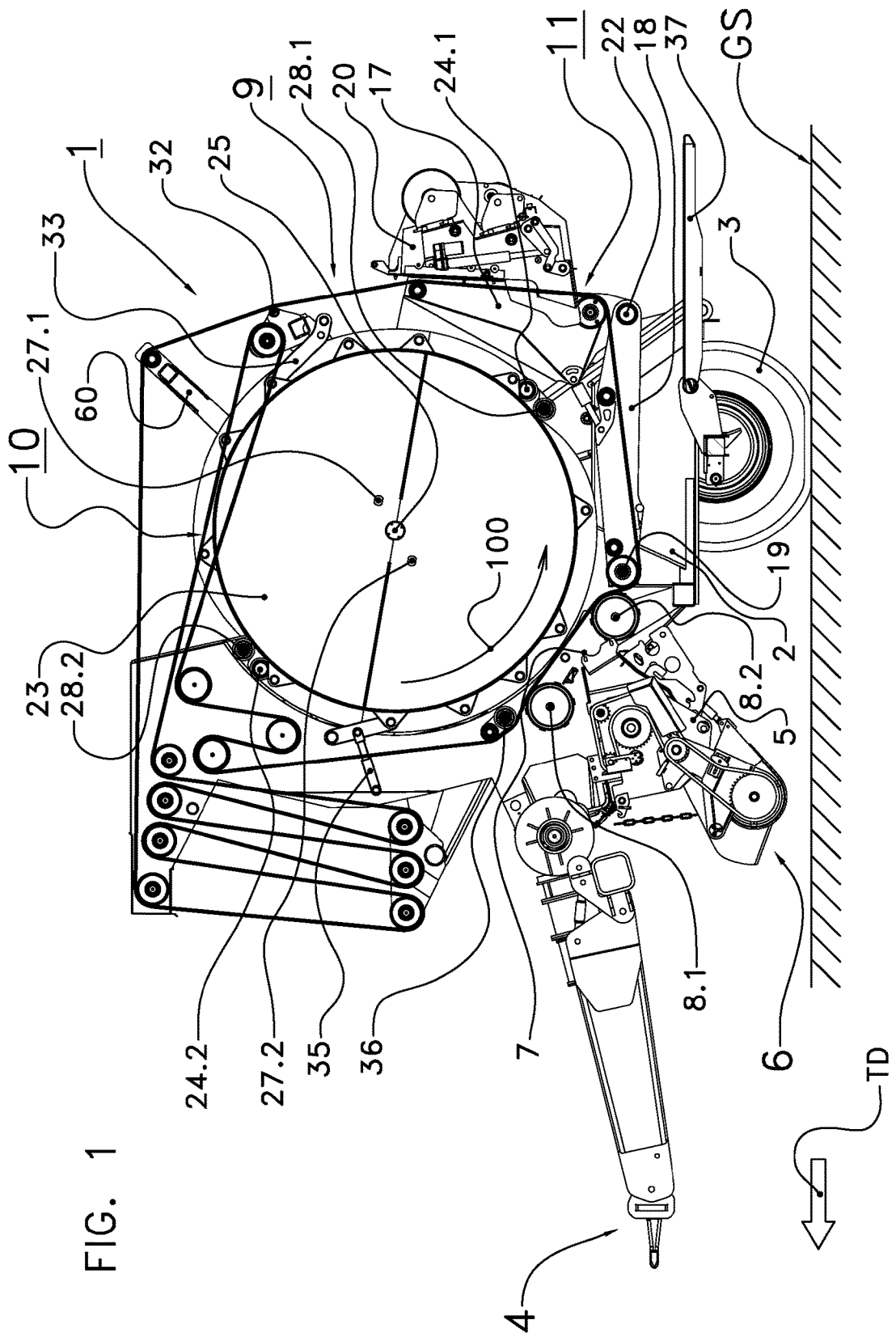
FIG. 1 shows a cross section of the bale forming apparatus with the bale supporting construction in the bale receiving position and without a bale.

FIG. 1 shows a bale forming apparatus, generally indicated with reference numeral 1. The bale forming apparatus 1 comprises a frame 2 which is supported by wheels 3. The bale forming apparatus 1 is configured to be connected at its front end 4 to a pulling vehicle, for instance to a tractor. The bale forming apparatus 1 is adapted for being pulled in a travelling direction TD, that is in FIG. 1 from right to left.

The bale forming apparatus 1 comprises an intake device 5 to take in crop material, such as silage, grass, hay, from a ground surface GS. The intake device 5 comprises an inlet 6 and an outlet 7. At opposite sides of the outlet 7 two stationary supporting rollers 8.1, 8.2 are provided. The rotating axes of these two supporting rollers 8.1, 8.2 are perpendicular to the drawing plane of FIG. 1.

Via the inlet 6 crop material is taken from the ground surface GS and transported to the outlet 7. A drum provided at the inlet 6 may be provided with tines to facilitate the picking up of crop material. The tines can be mounted in a flexible manner such that they can adapt to the ground profile.

The frame 2 comprises a front housing part. A bale forming device 9 is arranged on the frame 2 to form bales of crop material. The bale forming device 9 comprises at least one endless belt 10 and a number of guiding rollers supporting the endless belt(s) 10. Preferably several belts 10 are arranged parallel to each other. The belt(s) 10 operate as the bale forming means. A tensioning device is provided to maintain tension in the belt(s) 10.

The back end of the bale forming apparatus 1 is provided with a tailgate 11 which is constructed to support in a support area a bale B arranged on the tailgate 11. The tailgate 11 is pivotal about a rotation axis 16, cf. FIG. 2 to FIG. 4. In the preferred embodiment the tailgate 11 is at least movable (pivotal) between a bale receiving position, a bale supporting position and a bale ejecting position. This tailgate 11 serves as the bale supporting construction.

The tailgate 11 comprises
a tailgate frame 17 and
a tailgate bottom 18 carrying a tailgate bottom roller 19.

At the tailgate frame 17 a wrapping device 20 is mounted. A reel 88 provides wrapping material (net, foil, twine, e.g.) to a bale in the bale forming chamber.

In FIG. 1 the tailgate 11 is shown in the bale receiving position. This bale receiving position is also the position which the tailgate 11 takes during the formation of a bale and is also the transport position, i.e. the position in which the tailgate 11 is preferably positioned when the bale forming apparatus is not used to create bales but is pulled over a public street, e.g.

The bale forming apparatus 1 is configured to hold a bale in a first bale position and afterwards in a second bale position. The first bale position is arranged next to the outlet 7 of the intake device 5, and the second bale position is spaced away from the outlet 7.

In the first bale position, the bale formed or being formed is mainly supported by the two stationary supporting rollers 8.1, 8.2 arranged at opposite sides of the outlet 7 of the intake device 5, but may also partially be supported by the tailgate 11. The bale in the first bale position is in a bale forming chamber and is surrounded by the bale forming means 10.

The second bale position is defined by the bale supporting position of the tailgate 11. Thus, in this bale supporting position, the tailgate 11 holds a bale in the second bale position. This second bale position is positioned such that a new bale can be at least partially formed in the first bale position before the bale in the second bale position is ejected by the bale forming apparatus 1. Therefore the bale forming apparatus 1 carries at the same time a complete bale B on the bale supporting construction 11 and an increasing bale B' in the bale forming chamber adjacent to the outlet 7, cf. FIG. 9.

A bale can be transported from the first bale position to the second bale position by the following consecutive steps:
moving the bale from the first bale position away from the outlet 7 and onto the tailgate 11 arranged in the bale receiving position and
subsequently moving the tailgate 11 with the bale B from the bale receiving position into the bale supporting position.

Figure 2:
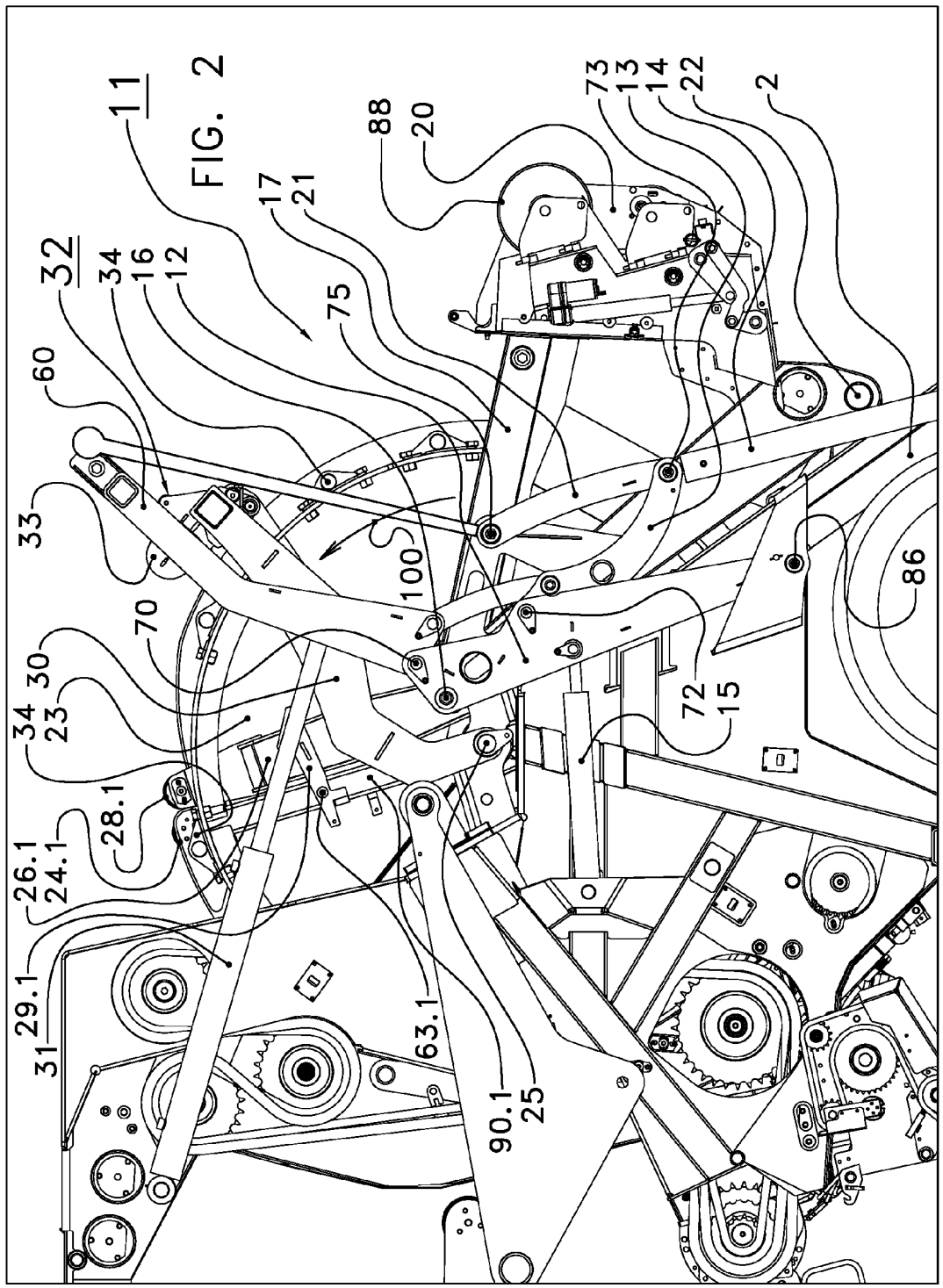
FIG. 2 shows a side view of the bale forming apparatus of FIG. 1 with the bale supporting construction in the bale receiving position.
Figure 3:
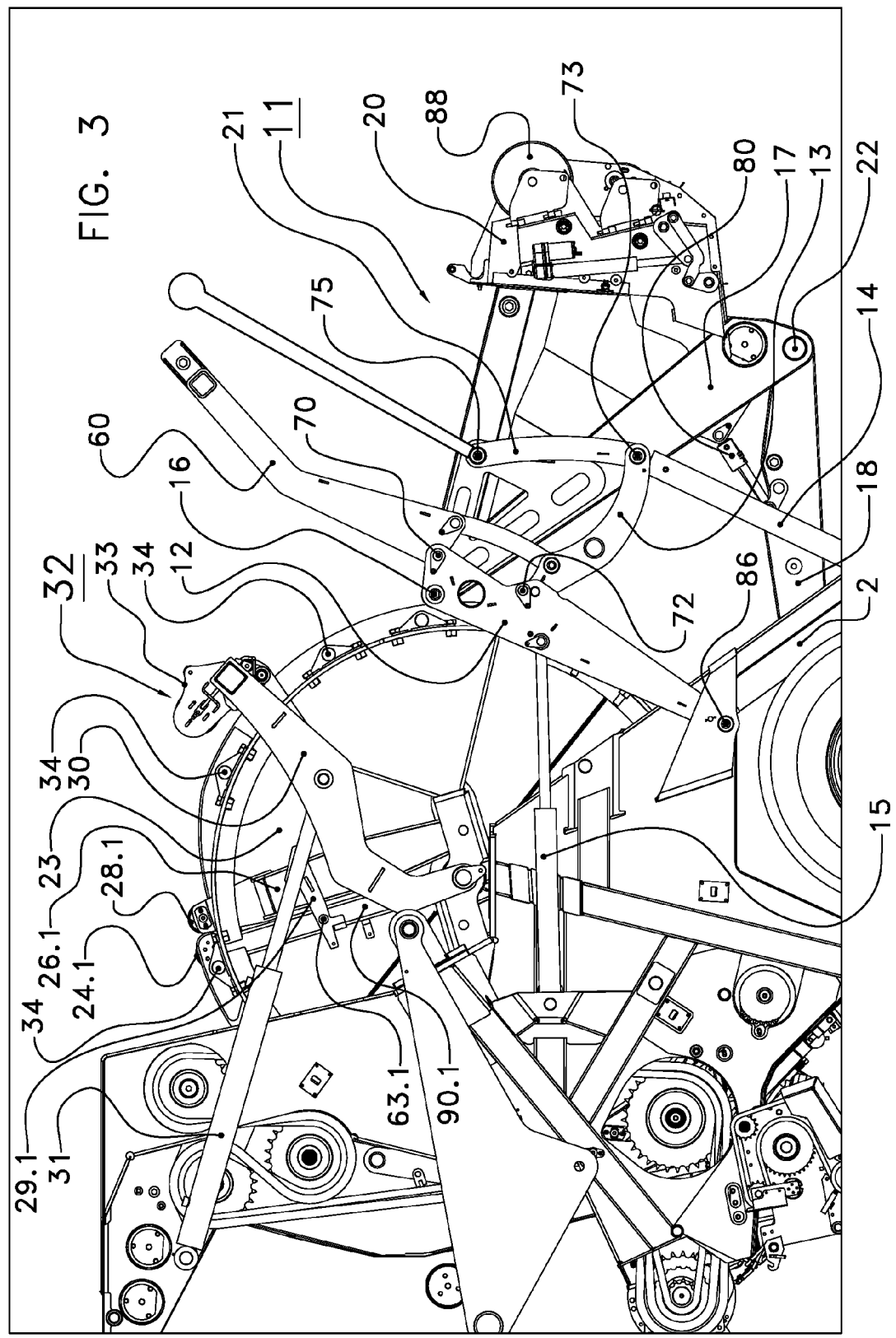
FIG. 3 shows the bale forming apparatus of FIG. 2 with the bale supporting construction in the bale supporting position.
Figure 4:
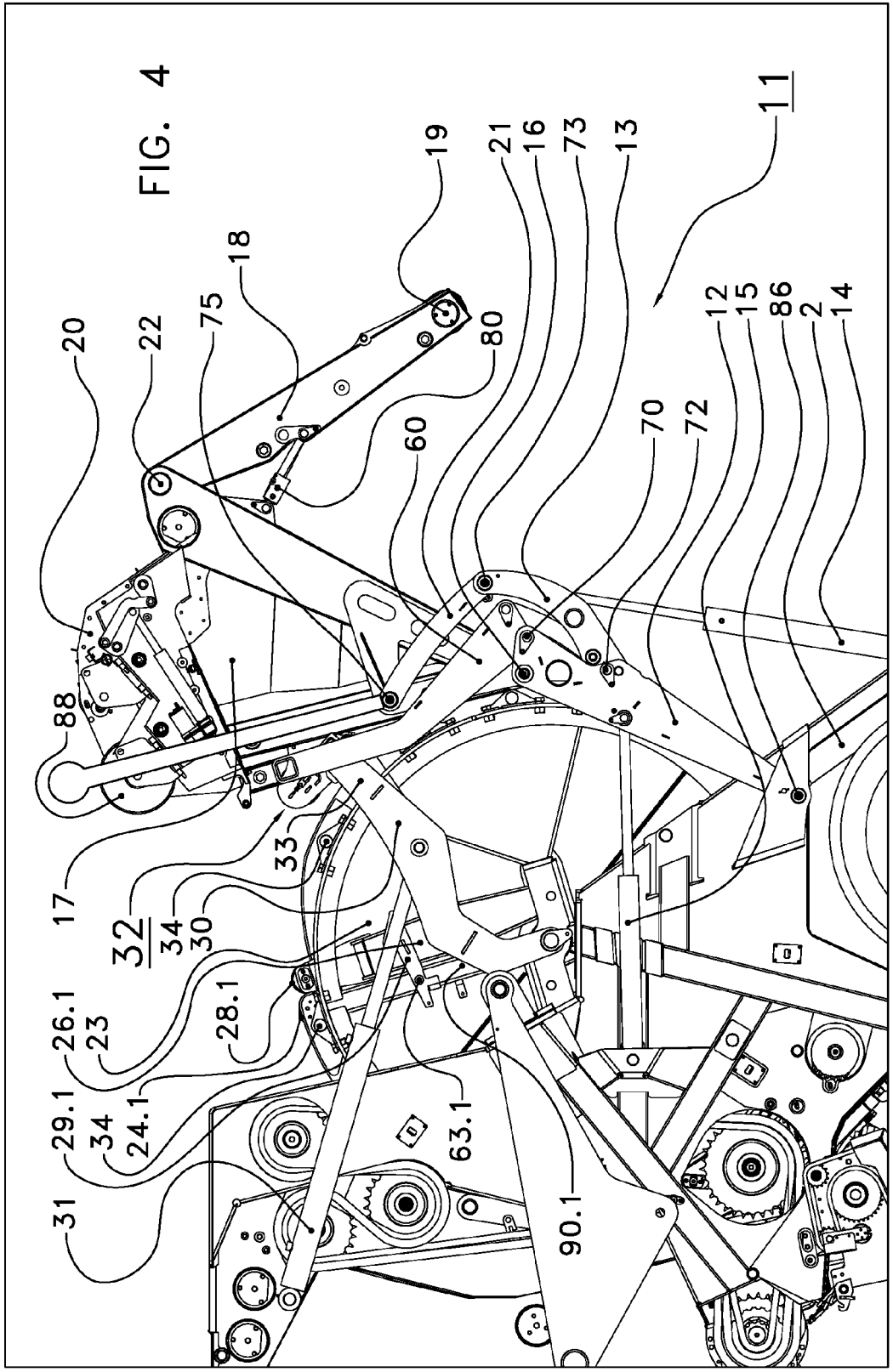
FIG. 4 shows the bale forming apparatus of FIG. 3 with the bale supporting construction in the bale ejecting position.

FIGS. 2 to 4 show the tailgate 11 in the bale receiving position, the bale supporting position, and in the bale ejecting position, respectively.

The tailgate 11 comprises a first mechanism to accommodate the movement of the tailgate 11 between the bale receiving position and the bale supporting position, and a second mechanism to accommodate the pivotal movement of the tailgate 11 between the bale supporting position and the bale ejecting position. The first mechanism is formed by a linkage mechanism which provides for a relatively horizontal movement of the tailgate 11 between the bale receiving position and the bale supporting position. The second mechanism is a pivoting mechanism which provides a tilting movement between the bale supporting position and the bale ejecting position, so that in the ejecting position the bale can be released from the tailgate 11 by force of gravity.

The linkage mechanism is formed by the frame 2, a rigid first tailgate lever arm 12, a rigid second tailgate lever arm 13, and a vertical hydraulic tailgate cylinder 14, cf. FIG. 2 to FIG. 4. The first tailgate lever arm 12 and the hydraulic vertical tailgate cylinder 14 are at their lower ends pivotally mounted on the frame 2. The upper ends of the first tailgate lever arm 12 and the hydraulic vertical tailgate cylinder 14 are connected to each other by means of the second tailgate lever arm 13. The second tailgate lever arm 13 is pivotally connected with the vertical tailgate cylinder 14 and with the first tailgate lever arm 12.

The first tailgate lever arm 12 is connected with the tailgate frame 17 in a pivoting axis 16. The third tailgate lever arm 21 is pivotally connected with the tailgate frame 17 in a pivoting axis 75. A distance between these two parallel pivoting axes 16, 75 occurs. The third tailgate lever arm 21 and the second tailgate lever arm 13 are pivotally connected with each other in a pivoting axis 73. The first tailgate lever arm 12 and the second tailgate lever arm 13 are pivotally connected in a pivoting axis 72. The first tailgate lever arm 12 is pivotally mounted at the frame (front housing part) such that the first tailgate lever arm 12 can rotate around a stationary pivoting axis 86.

By movement of the tailgate 11 about the pivoting axes of the linkage mechanism 12, 13, 14, the tailgate 11 can be moved between the bale receiving position and the bale supporting position, as can be seen from a comparison of FIG. 2 in which the tailgate is shown in the bale receiving position with FIG. 3 in which the tailgate 11 is shown in the bale supporting position. Between these positions the tailgate 11 has been displaced in a substantially horizontal direction away from the outlet 7. A movement in a substantially horizontal direction is advantageous as the support surface for the bale formed by a part of the endless belt(s) 10 in the tailgate 11 also remains substantially horizontal, and, as a result, the bale B remains properly supported by the tailgate 11.

A hydraulic horizontal tailgate cylinder 15 is provided to actuate the tailgate 11 between the bale receiving position and the bale supporting position. FIG. 2 shows the horizontal tailgate cylinder 15 in a retracted position, FIG. 3 in an extended position.

The first tailgate lever arm 12 comprises a pivoting axis 16 about which the pivotal tailgate frame 17 is pivotal between the bale supporting position (FIG. 3) and the bale ejecting position (FIG. 4). The pivotal tailgate frame 17 supports the pivotal tailgate bottom 18 carrying a tailgate bottom roller 19, and a wrapping device 20 with a reel 88 for wrapping material (net or foil or yarn, e.g.). This tailgate bottom roller 19 serves as the further guiding member in the sense of depending claims.

By extending and retracting the vertical hydraulic cylinder 14, the pivotal tailgate frame 17 can be moved in a pivotal movement about the pivoting axis 16. FIG. 3 shows the vertical tailgate cylinder 14 in a retracted position, FIG. 4 in an extended position. A rigid third tailgate lever arm 21 is mounted between the pivotal connection of the second tailgate lever arm 13 and the vertical hydraulic cylinder 14 to transfer the actuation force exerted by the vertical hydraulic cylinder 14 to the pivotal tailgate frame 17.

FIG. 2 to FIG. 4 shows three rigid tailgate lever arms 12, 13, 21 and two tailgate cylinders 14, 15 mounted on the left side of the tailgate 11—seen in the travelling direction TD. Three corresponding rigid tailgate lever arms and two corresponding hydraulic tailgate cylinders (not shown) are mounted at the right side of the tailgate 11.

The pivotal tailgate bottom 18 can be pivoted with respect to the tailgate frame 17 about a pivoting axis 22 to move the tailgate bottom roller 19, when the tailgate 11 is positioned in the bale receiving position, between a high position and a low position. A hydraulic horizontal tailgate bottom cylinder 80 may be provided to move the pivotal tailgate bottom 18 between the high and the low position. This tailgate bottom cylinder 80 is connected with the tailgate frame 17 (right side) and with the tailgate bottom 18 (left side).

Figure 5:
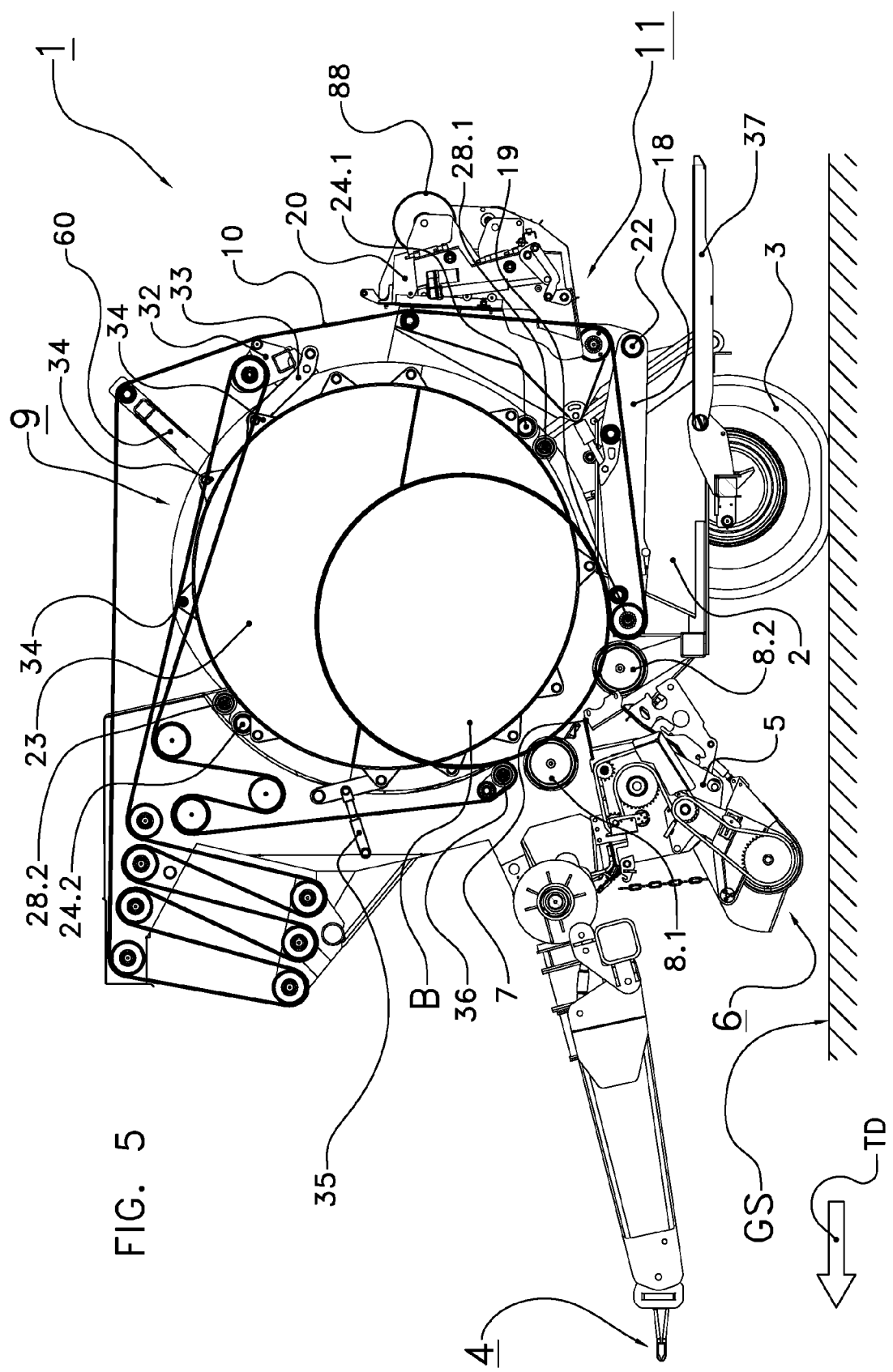
FIG. 5 shows a cross section of the bale forming apparatus of FIG. 1 with a completely formed bale in the bale forming chamber and the bale supporting construction in the bale receiving position and the pushing member and the pivotal guiding roller locked together and being in the pushing start position.
Figure 6:
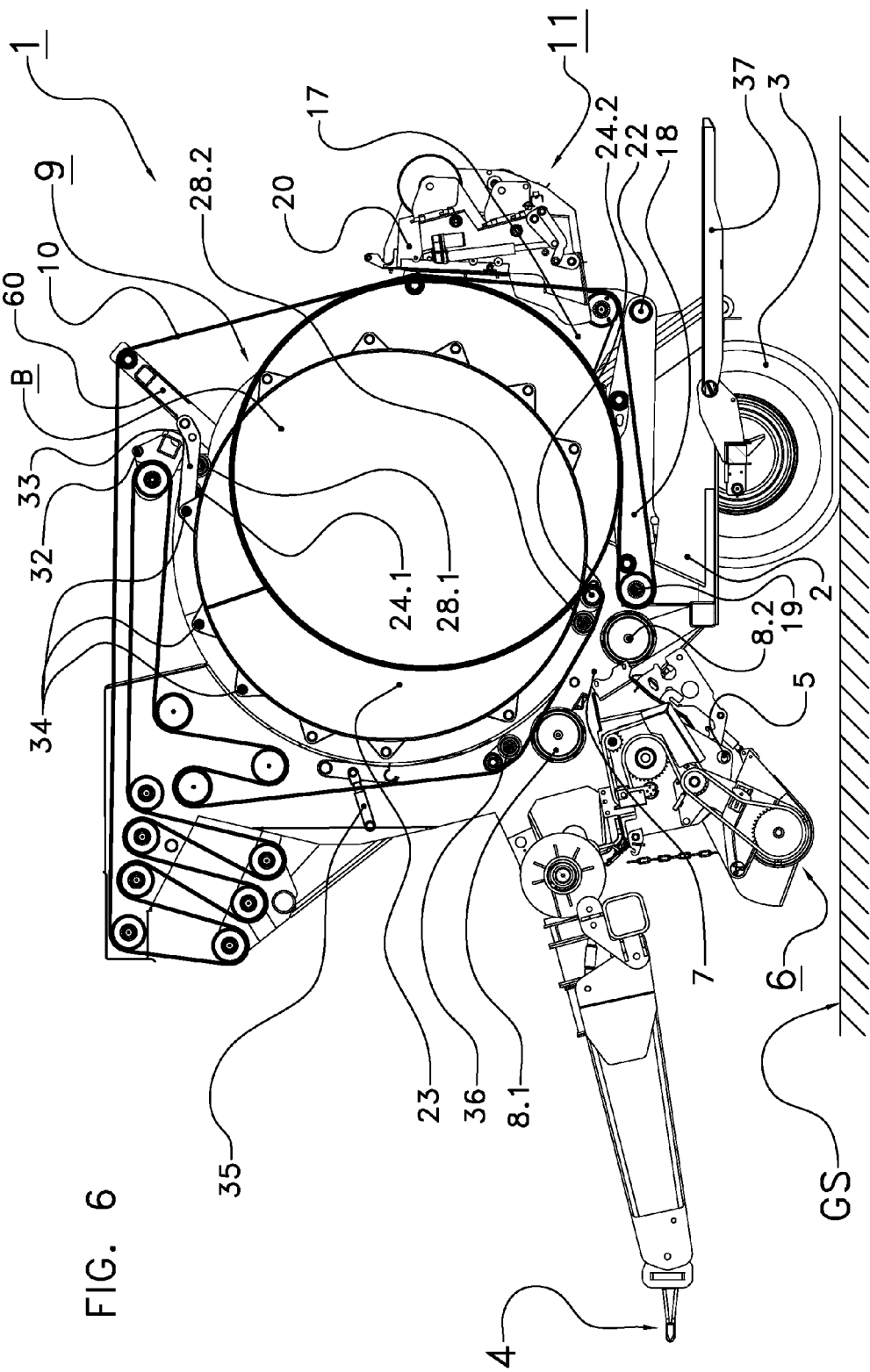
FIG. 6 shows the bale forming apparatus of FIG. 5 with the bale pushed onto the bale supporting construction still being in the bale receiving position where the pushing roller and pivotal guiding roller still locked together are rotated in the pushing direction into an intermediate position.

During formation of a bale in the first bale position, the tailgate bottom roller 19 is normally positioned in the high position. When the bale is to be transferred from the first bale position to the second bale position, the high position of the tailgate bottom roller 19 may interfere with other elements of the bale forming device, for instance movements of a pushing roller and the tailgate bottom roller 19 to be described below. To avoid such interference the tailgate bottom roller 19 may be positioned in the low position while the tailgate 11 is still in the bale receiving position. FIG. 5 and FIG. 6 show the high position, FIG. 7 the low position.

The bale forming apparatus 1 comprises two supporting disks 23 arranged at opposite sides of the bale forming apparatus 1. The figures show the left supporting disk 23—seen in the travelling direction TD. The bale forming chamber is arranged between these two parallel supporting disks 23. Every supporting disk 23 is arranged between the frame 2 and the bale forming chamber. These two disks 23 together belong to the holding device of the embodiment. Between the two supporting disks 23 two pushing rollers 24.1, 24.2 are mounted on the circumference of the supporting disks 23 at an angle of 180 degrees. The two supporting disks 23 are rotatable about a substantially horizontal disk rotating axis 25 in a rotating direction 100. The disk rotating axis 25 is situated in the middle between these two pushing rollers 24.1, 24.2.

In one embodiment the two supporting disks 23 are further connected by means of a rigid idler axle. This idler axle extends along the stationary disk rotating axis 25 and can be rotated around the disk rotating axis 25. In a further embodiment the two parallel supporting disks 23 are only connected by the two pushing rollers 24.1, 24.2 and the pivotal guiding rollers 28.1, 28.2 (describe below). This further embodiment provides more space between the two parallel supporting disks 23. This space can be used for a bale growing in the bale forming chamber.

The pushing roller 24.1 is mounted on a supporting arm 90.1. The pushing roller 24.2 is mounted on a supporting arm 90.2. The supporting arms 90.1, 90.2 operate as spokes of the left supporting disk 23. The pushing rollers 24.1, 24.2 are in addition mounted on two further corresponding supporting arms (not shown) which serve as spokes of the right supporting disk.

In the embodiment the two pushing rollers can rotate around their own rotating axes (perpendicular to the drawing plain of the figures) but cannot amend their position with respect to the supporting disks 23. Therefore the pushing rollers 24.1, 24.2 remain in their positions with respect to the circumferential surfaces of the supporting disks 23 during the entire operation.

In one embodiment a stationary retarding device 35 prevents the supporting disks 23 from rotating in a direction opposite to the rotating direction 100. In one embodiment a stop element mounted at a supporting disk 23 is stopped by the retarding device 35 if the supporting disks 23 are rotated in the opposite direction. The retarding device 35 does not inhibit the rotation of the supporting disks 23 in the rotating direction 100.

In one embodiment a spring or an alternative retaining device urges a pivotally mounted flipper element against a supporting disk 23. This flipper element contacts the supporting disk 23 and prevents it from rotating in a direction opposite to the rotating direction 100. When being rotated in the rotating direction 100 the supporting disk 23 pivots the flipper element against the force of the spring.

The pushing rollers 24.1, 24.2 extend between the two supporting disks 23 and are connected with these supporting disks 23 such that every pushing roller 24.1, 24.2 can rotate around a rotating axis parallel to the disk rotating axis 25 but cannot be shifted laterally and cannot be shifted along the circumferential edge of a supporting disk 23. Every pushing roller 24.1, 24.2 comprises a rigid axle connecting the two supporting disks 23. These pushing rollers 24.1, 24.2 serve as the pushing members in the sense of the claims.

The left supporting disk 23 pivotally supports two swing arms 26.1, 26.2 for two pivotal guiding rollers 28.1, 28.2. The corresponding right supporting disk pivotally supports two corresponding further swing arms. The pivotal guiding roller 28.1 is supported by a pair of two swing arms (left swing arm, right swing arm) which are pivotally mounted on one arm pivoting axis 27.1. The position shown in FIG. 8 to FIG. 11 is called the "guiding position" as the pivotal guiding rollers 28.1 and 28.2 guide the belt(s) 10 when being in the guiding position. FIG. 5 to FIG. 7 show the pivotal guiding roller 28.1 in a parking position in which the pivotal guiding roller 28.1 does not guide—or at least does not stretch and does not tension—the belt(s) 10.

The pivotal guiding roller 28.2 is supported by a further pair of two swing arms which are pivotally mounted on one arm pivoting axis 27.2. The radially extending free ends of the two swing arms of such a pair carry the connected pivotal guiding roller 28.1 or 28.2 between them. A bale B in the bale forming chamber is situated between two swing arms of such a pair. As the bale forming apparatus 1 comprises two pivotal guiding rollers 28.1, 28.2, there are four swing arms (two pairs each with two swing arms). The pivotal guiding roller 28.1 or 28.2 connects the two swing arms of a pair. FIG. 2 to FIG. 4 show one swing arm 26.1.

These pivotal guiding rollers 28.1, 28.2 serve as the pivotal guiding members in the sense of the claims. The swing arms 26.1, 26.2 operate as the guiding member arms.

Preferably every pushing roller 24.1, 24.2 and every pivotal guiding roller 28.1, 28.2 comprise rolls which are adapted for guiding and supporting the belt(s) 10. But every pushing roller 24.1, 24.2 and every pivotal guiding roller 28.1, 28.2 is only temporally in contact with the pressing belts(s) 10 and guides and stretches them only temporally. In one embodiment two lateral guiding units (not shown) inhibit a lateral movement of a belt 10, i.e. a movement of the belt 10 parallel to the disk rotating axis 25. Every such lateral guiding unit can comprise a disk which rotates around a rotating axis perpendicular to the conveying direction of the belt(s) 10.

The belt(s) 10 are guided by further guiding rollers, cf. FIG. 1. In order to ensure permanently a sufficient tension a guiding roller is mounted on the free end of a tensioning arm 60. This tensioning arm 60 can be pivoted around a pivoting axis being perpendicular to the drawing plain of FIG. 1.

The arm pivoting axes 27.1, 27.2 are arranged substantially parallel, but spaced away from the disk rotating axis 25 what can best be seen in FIG. 1. Therefore a lever arm between the disk rotating axis 25 and a swing arm 26.1, 26.2 occurs. In the position shown in FIG. 1 the pushing roller 24.1 and the pivotal guiding roller 28.1 are positioned next to each other on the circumference of the supporting disks 23. The pushing roller 24.2 and the pivotal guiding roller 28.2 are also positioned next to each other. By rotating a pair of two swing arms about the pivoting axis 27.1 or 27.2, the connected pivotal guiding roller 28.1 or 28.2 can be moved to a position spaced from the corresponding pushing roller 24.1 or 24.2 (the guiding position). Due to the relative position between the disk rotating axis 25 of the supporting disks 23 and the corresponding pivoting axle 27.1, 27.2 of the pair of swing arms, the pivotal guiding roller 28.1, 28.2 will during such movement also be moved to a position radially outwards from the circumference of the supporting disks 23. The distance between a pivotal guiding roller 28.1, 28.2 and the disk rotating axis 25 increases while the pivotal guiding roller 28.1, 28.2 is pivoted into the guiding position.

As this lever arm between the pivoting axis 27.1, 27.2 and the disk rotating axis 25 occurs, every swing arm 26.1, 26.2 is pushed by the rotating supporting disk 23 and shifts the connected pivotal guiding roller 28.1, 28.2 away from the disk rotating axis 25. Preferably a longitudinal slot guides the pivotal guiding roller 28.1, 28.2 and limits a movement of the pivotal guiding roller 28.1, 28.2. The longitudinal slot extends approximately vertical and can be arcuate. This embodiment saves an own drive for the swing arms 26.1, 26.2 or for the pivotal guiding rollers 28.1, 28.2 besides the drive (described below) for the supporting disk 23. The rotating supporting disk 23, the swing arms 26.1, 26.2 being connected in the pivoting axes 27.1, 27.2 spaced away from the disk rotating axis 25, and the pivotal guiding roller 28.1, 28.2 operate like a reciprocating piston arrangement of a square baler, e.g.

With this relative movement between the pivotal guiding roller 28.1, 28.2 and the supporting disks 23, the pivotal guiding roller 28.1, 28.2 can be positioned in a guiding position relatively next to the rear stationary supporting roller 8.2 at the back side of the outlet 7. When being pivoted into the guiding position, the pivotal guiding roller 28.1, 28.2 is in this next position. It may be possible that the pivotal guiding roller 28.1, 28.2 being near the outlet 7 can only be moved to this position after the tailgate bottom roller 19 has been moved to the low position, cf. FIG. 7.

Any suitable device may be provided to move a pair of two swing arms between different rotational positions.

In the embodiment shown in FIGS. 2 to 4, a locking pawl 29.1 is provided to hold the pivotal guiding roller 28.1 in the parking position adjacent to the pushing roller 24.1, as shown in FIG. 1 to FIG. 7. This locking pawl 29.1 is pivotally mounted at the supporting arm 90.1 for the pushing roller 24.1 and can be locked with the swing arm 26.1. A further locking pawl 29.2 is provided to hold the pivotal guiding roller 28.2 in the position adjacent to the pushing roller 24.2 and is pivotally mounted at the supporting arm 90.2.

In this embodiment every locking pawl 29.1, 29.2 is pivotally connected with one supporting arm 90.1, 90.2 of the supporting disk 23 and can engage into a corresponding holding element rigidly mounted at the swing arm 26.1, see FIG. 2 to FIG. 4. This holding element may be a pin rigidly mounted on the swing arm 26.1, 26.2. The locking pawl 29.1 is shown in a locking position. An actuator can pivot the locking pawl 29.1 away from this holding element such that connection between the swing arm 26.1 and the locking pawl 29.1 is released. The actuator can shift back the locking pawl 29.1, 29.2 into a locking position in which the locking pawl 29.1, 29.2 engages the pin or the other holding element on the swing arm 26.1, 26.2.

The locking pawl 29.1 can connect the supporting arm 90.1 with the swing arm 26.1. Three further locking devices connect the other three swing arms with the adjacent supporting arm, among them one locking pawl 29.2 for connecting the swing arm 26.1 for the guiding roller 28.2 with the supporting arm 90.2 for the pushing roller 24.2.

A disk actuation system is provided to move the supporting disks 23 around the rotational axis between different rotational positions. Preferably this drive rotates the two supporting disks 23 in an indexing fashion. The disk actuation system of the embodiment comprises an actuator arm 30 pivotally mounted about the disk rotating axis 25, an actuating cylinder 31 to actuate movement of the actuator arm 30, and a coupling device 32. The actuating cylinder 31 is at its lower end pivotally connected with the frame 2 end at its upper and pivotally connected with the actuator arm 30. The coupling device 32 comprises

- a disk engaging hook 33 biased towards the supporting disks 23 and
- a hydraulic cylinder for pivoting this disk engaging hook 33.

The supporting disks 23 have about their circumference several coupling pins 34.

By pulling the actuator arm 30 in the rotating direction 100 towards the front end 4 of the bale forming apparatus 1, the disk engaging hook 33 will couple with one of the coupling pins 34. The actuator arm 30 connected via the disk engaging hook 33 rotate the supporting disks 23 about the disk rotating axis 25 also in the rotating direction 100 to a desired rotational position. The movement of the supporting disks 23 to a desired position may be carried out by one or more strokes of the actuating cylinder 31. When the actuating cylinder 31 is extended to move the actuator arm 30 back, i.e. away from the front end 4 of the bale forming apparatus 1 and opposite to the rotating direction 100, any coupling pins 34 which are encountered during the backwards trajectory will not be coupled to the disk engaging hook 33. By these forward and backwards movements of the actuator arm 30, the supporting disks 23 may be moved to any desired rotational position. As mentioned above a rotation of the supporting disks 23 in the opposite direction is inhibited.

The retarding device 35 is provided to lock the rotational position of the supporting disks 23, for example when the actuator arm 30 is moved by the actuating cylinder 31 in a backwards direction opposite to the rotating direction 100 during which the disk engaging hook 33 is not coupled to any of the coupling pins 34.

It is remarked that any other device to move the supporting disks 23 in a rotational movement may also be applied. In particular a shaft extending along the disk rotating axis 25 can be driven and rotates the two supporting disks 23. It is also possible that at least one driven sprocket wheel engages corresponding teeth at the outer surface of a supporting disk 23 and rotates the supporting disk 23. The formation and the transfer of a bale until ejecting it and the function of the different parts of the bale forming apparatus 1 therein will now be presented in more detail.

FIG. 1 and FIG. 2 show the bale forming apparatus 1 with the tailgate 11 in the bale receiving position, e.g. the fully closed position of the tailgate 11, and the tailgate frame 17 in a first position or start position and having the horizontal tailgate cylinder 15 in the extended position. Crop material is introduced through the outlet 7 into a bale forming chamber surrounded by the segment of the bale forming means 10 extending between the tailgate bottom roller 19 and a fixed guiding roller 36.

FIG. 5 shows a bale B being formed in the first bale position in the bale forming apparatus 1. The bale B is supported by the two stationary supporting rollers 8.1, 8.2 and the tailgate bottom roller 19 mounted at the free end of the pivotal tailgate bottom 18 of the tailgate 11. By continuously feeding further crop material through the outlet 7, the bale B grows until a selected parameter is fulfilled, such as a desired diameter or weight of the bale B is achieved, a selected time interval has passed, or a selected tension in the endless belt(s) 10 operating as the bale forming means is reached.

It is remarked that the selected parameter can be monitored by any suitable sensor. For example, an ultrasonic or optical sensor may be provided to measure the current diameter of the bale being formed in the bale forming apparatus. The sensor may be directed radially with respect to the bale. Or a tensioning sensor measures the tension of the bale forming means 10.

The bale B shown in FIG. 5 is ready to be transferred to the second bale position, for instance since the bale has a desired diameter or exerts a pressure to the belt(s) 10 which exceeds a given threshold. A first step to transfer the bale B to the second bale position is to transfer the bale B completely onto the tailgate 11 so that the bale B is completely supported by the tailgate 11 and in particular entirely carried by the tailgate bottom 18. To move the bale B onto the tailgate 11, the bale B is pushed by the pushing roller 24.2 on the tailgate 11 by rotation of the supporting disks 23 counter clockwise in the rotation direction 100. The pushing roller 24.2 performs a movement on a circular path until the pushing roller 24.2 has passed the outlet 7. During this part of the rotating movement of the supporting disks 23, the locking pawl 29.2 remains in the locking position. The locking pawl 29.1 in the locking position maintains the relative position between the pushing roller 24.1 and the pivotal guiding roller 28.1 adjacent to each other. The connected rollers 24.1, 28.1 both remain in a parking position.

FIG. 6 shows the bale forming apparatus 1 after having rotated the supporting disks 23 in the rotation direction 100. The pushing roller 24.2 mounted on the supporting arm 90.2 has been moved along a circular path, cf. FIG. 5 and FIG. 6. The bale B has been pushed by the pushing roller 24.2 completely onto the tailgate 11 which is positioned in the bale receiving position. The rotation of the supporting disks 23 is performed by one or more forward movements of the actuator arm 30 in the rotating direction 100, while the disk engaging hook 33 is coupled to one of the coupling pins 34. During a backwards movement of the actuator arm 30 opposite to the rotating direction 100 the disk engaging hook 33 is not coupled to the coupling pins 34 so that the disk engaging hook 33 can be moved to a further coupling pin 34 for renewed actuation of the supporting disks 23. During the backwards movements, the retarding device 35 may hold the supporting disks 23 in a fixed rotational position. The retarding device 35 or the flipper elements prevent the supporting disks 23 from rotating opposite to the rotating direction 100.

Due to the rotation of the supporting disks 23 and therewith the movement of the pushing roller 24.2 in the pushing direction and along the circular path past the outlet 7 of the intake device 5, the function of the fixed guiding element 36 to guide the belt(s) 10 and to form the bale forming chamber holding the bale B is taken over by the pushing roller 24.2 mounted on the supporting disks 23. In other words the bale forming chamber formed for holding the bale B is now formed by the segment of the belt(s) 10 between the tailgate bottom roller 19 and the pushing roller 24.2.

In a second step of the transfer of the bale B from the first bale position to the second bale position, the tailgate 11 is moved from the bale receiving position to the bale supporting position. This movement about the pivoting axes of the linkage mechanism 12, 13, 14 is actuated by the hydraulic horizontal tailgate cylinder 15.

Substantially simultaneously to the movement of the tailgate 11 from the bale receiving position to the bale supporting position the supporting disks 23 are rotated to maintain substantially the same distance between the tailgate bottom roller 19 and the pushing roller 24.2 so that the bale B is maintained in the bale forming chamber formed by the belt segment between the tailgate bottom roller 19 and the pushing roller 24.2.

However, before these movements of the tailgate 11 and the supporting disks 23 are made, the tailgate bottom roller 19 is brought into the low position. In this position it does not interfere with the circular path of movement of the pushing roller 24.2. In one embodiment the step of lowering the tailgate bottom roller 19 is performed before the step of rotating the two supporting disk 23. The lowering step is the transfer of the tailgate bottom roller 19 from the position of FIG. 5 to that of FIG. 7. The subsequent rotating step is the rotation of the supporting disk 23 from the position of FIG. 5 to that of FIG. 6.

FIG. 7 shows the bale forming apparatus 1 after the movement of the tailgate bottom roller 19 from the high position to the low position but before the movement of the tailgate 11 from the bale receiving position to the bale supporting position.

In one embodiment the supporting disks 23 are pivotally connected with the pivotal tailgate bottom 18, e.g. by means of a lever arrangement (not shown). The step that the rotated supporting disks 23 guide the pushing roller 24.2 from the parking position shown in FIG. 5 into the position behind the outlet 7 shown in FIG. 7 urges the pivotal tailgate bottom 18 to be lowered down. This embodiment further decreases the risk that the rotated pushing roller 24.2 hits the tailgate bottom roller 19.

FIG. 8 shows the bale forming apparatus 1 after having moved the tailgate 11 carrying the bale B from the bale receiving position to the bale supporting position. FIG. 8 shows the bale forming apparatus 1 after the simultaneous rotation of the supporting disks 23 to move the pushing rollers 24.1, 24.2 to maintain a substantially same distance between the tailgate bottom roller 19 and the pushing roller 24.2.

The bale B is now positioned in the second bale position.

In addition the transfer from FIG. 7 to FIG. 8 comprises the step that the locking pawl 29.2 and the corresponding locking pawl on the right side which have connected the two rollers 24.2, 28.2 with each other are pivoted into a releasing position. The rollers 24.2, 28.2 are no longer connected with each other. During the rotation of the supporting disks 23, the pair of swing arms for the pivotal guiding roller 28.2 has also been rotated about the pivoting axis 27.2 in the opposite direction to create a distance between the pushing roller 24.2 and the pivotal guiding roller 28.2. Due to the rotation about the pivoting axis 27.2, and the mutual relation between the pivoting axis 27.2 of the pair of swing arms for the pivotal guiding roller 28.2 and the disk rotating axis 25 of the supporting disks 23, the pivotal guiding roller 28.2 is extended radially outwards with respect to its radial position next to the pushing roller 24.2, as shown in FIG. 7. The pivotal guiding roller 28.2 is now in the guiding position and contributes to form a bale forming chamber adjacent to the outlet 7.

The movement of the pair of swing arms (the swing arm 26.2 and the corresponding right swing arm) to move the pivotal guiding roller 28.2 between the position next to the pushing roller 24.2, as shown in FIG. 7, to a position spaced from the pushing roller 24.2, as shown in FIG. 8, may be actuated by any suitable actuator, which may be arranged on one or both of the supporting disk 23, on the frame 2 or any other suitable location. The movement may also be created by a suitable guiding mechanism and/or a retarding mechanism. In one embodiment the rotating disks 23 shift the pivotally mounted swing arms 26.1, 26.2 for the pivotal guiding roller 28.2. The pivotal guiding roller 28.2 is pushed and is guided in the longitudinal slots from the position shown in FIG. 7 to the position shown in FIG. 8.

The wrapping device 20 may provide a wrap around the bale B during transfer of the bale B towards and/or when the bale B is arranged on the tailgate 11 in the second bale position. In the embodiment, the wrapping device 20 with the reel 88 is arranged at the rear end of the bale forming apparatus 1. The winding of the wrapping material around the bale may already be started in the first bale position, as long as there is no wrapping material between the outlet 7 of the intake device 5 and the bale B being formed.

Preferably, a wrap is already provided around a substantial part of the circumference when the bale B is in the first bale position, whereby there is no wrapping material between the outlet 7 of the intake device 5 and the bale B being formed. The rotating bale B remains in the first position and pulls wrapping material counter clockwise along the bale forming means 10. The bale B is pushed onto the tailgate 11 before the wrapping material reaches the outlet 7. The wrapping material will not hamper the entrance of crop material in the bale forming chamber and thus do not prevent the formation of the bale B in the bale forming chamber. As soon as the bale B has the desired size, in particular when the pushing roller 24.2 is moved to push the bale B on the tailgate 11 in the bale receiving position, the wrapping device 20 may release further wrapping material to provide a wrap around the complete circumference of the bale. In this way the wrapping material is provided relatively quickly about the complete circumference of the bale B. This reduces the risk that the crop material of the bale will loosen or even fall apart during transfer of the bale from the first bale position to the second bale position.

In the first bale position next to the outlet 7 of the intake device 5, space is now available for the formation of a new bale. In the situation shown in FIG. 8 the formation of a new bale B' has already started. The part of the endless belt(s) 10 between the fixed guiding roller 36 and the pivotal guiding roller 28.2 being in the guiding position is used to form a bale forming chamber adjacent to the outlet 7 for the new bale B'. Since the pivotal guiding roller 28.2 is spaced at a substantial distance from the pushing roller 24.2, the bale B' may grow to a substantial diameter before the bale B' in the first bale position interferes with the bale B in the second bale position, as shown in FIG. 9. This effect is in particular achieved as the bale supporting construction 11 with the bale B is first pivoted into an intermediate bale supporting position before ejecting the bale B. The wrapping of the bale B is completed while the bale is on the bale supporting construction 11 being in the bale supporting position. The bale B can now be ejected.

When the bale B is ready to be ejected from the bale forming apparatus 1, the tailgate 11 is moved from the bale supporting position around the pivoting axis 16 into the bale ejecting position. This bale ejecting position may correspond to the fully open position of the tailgate 11 of the bale forming apparatus, wherein a bale is ejected from the bale forming apparatus 1.

FIG. 10 shows the tailgate 11 in the bale ejecting position. The tailgate 11 is moved to this bale ejecting position by a pivoting movement of the pivotal tailgate frame 17 about the pivoting axis 16. This pivoting movement is actuated by an extension of the vertical hydraulic cylinder 14, cf. FIG. 3 and FIG. 4. In this bale ejecting position the bale B is ejected by force of gravity from the bale forming apparatus 1. A release control device 37 is provided to control actual release of the bale B from the bale forming apparatus. Such mechanical release control device 37 is known in the art. This release control device 37 may comprise a ramp or chute over which the bale B rolls down onto the grown surface GS. In a further embodiment a rigid rod causes the bale B to be tilted such that the bale B lies on a front face and cannot role away.

During ejecting and thereby releasing the bale B from the bale forming apparatus 1, the supporting disks 23 are held in the same rotational position so that the pushing rollers 24.1, 24.2 and the pivotal guiding rollers 28.1, 28.2 remain in substantially the same position.

The bale B' in the first bale position continues to grow in the bale forming chamber formed by the belt segment between the pivotal guiding roller 28.2 and the fixed guiding element 36 at least until the "old" bale B is released from the bale forming apparatus 1 and the tailgate 11 is returned in a position in or near the bale receiving position wherein the tailgate bottom roller 19 of the tailgate 11 can take over the function of the pivotal guiding roller 28.2 to form a bale forming chamber together with the fixed guiding roller 36.

FIG. 11 shows a position of the tailgate 11 where the tailgate 11 is almost returned to the bale receiving position after having ejected the bale B. The pivotal guiding roller 28.2 is still in the guiding position. To move the tailgate 11 back to the bale receiving position, the pivotal tailgate frame 17 is pivoted back to the bale supporting position by retracting the vertical hydraulic cylinder 14. Consequently the linkage mechanism 12, 13, 21 is pivoted about its pivoting axes, by retracting the horizontal hydraulic cylinder 15 to move the tailgate 11 back to the bale receiving position. The tailgate bottom roller 19 is still positioned in the low position since the pivotal guiding roller 28.2 is still in the guiding position next to the supporting roller 8.2.

Before the tailgate 11 can be completely moved to the original bale receiving position, i.e. with the tailgate bottom roller 19 in the high position, the tailgate bottom roller 19 has to be moved upwards, i.e. back to its position next to the pushing roller 24.2.

By movement of the corresponding swing arms, the connected pivotal guiding roller 28.2 can be moved in the position next to the pushing roller 24.2 (parking position). By rotation of the supporting disks 23, the pushing roller 24.2 and the pivotal guiding roller 28.2 can be moved to the position shown in FIG. 1 at the lower back side of the supporting disks 23. The supporting disks 23 have been rotated over an angle of 180 degrees during the sequence shown from FIG. 1 to FIG. 11.

The supporting disks 23 support two sets of rollers: the pushing roller 24.1 and the pivotal guiding roller 28.1 (first set) and the pushing roller 24.2 and the pivotal guiding roller 28.2 (second set). The second set was used for transferring the bale B, cf. FIG. 5 to FIG. 10. In the embodiment these two sets are disposed diametrically opposed to each other, i.e. at 180 degrees on the circumference of the supporting disks 23. Therefore the first set of pushing roller 24.1 and pivotal guiding roller 28.1 is now ready to be used for a transfer of the new bale B' from the first bale position to the second bale position. The tailgate 11 can also be brought back in the original position as shown in FIG. 1.

When the bale B' fulfills the selected parameter or parameters (size or pressure or time period), the transfer of the bale B' from the first bale position to the second bale position may now be performed, similar to the transfer of the bale B described above, and a new bale may be formed in the first bale position. Thereafter further cylindrical bales may be formed with the bale forming apparatus 1. For each bale, the tailgate 11 will be moved from the bale receiving position, via the bale supporting position to the bale ejecting position and back to the bale receiving position, and the supporting disks 23 will be rotated over an angle of 180 degrees per formed bale.

The movements of the tailgate 11 and the supporting disks 23 may be configured such that continuous taking in of crop material into the bale forming apparatus 1, even at a high rate, and thus continuous driving of the bale forming apparatus 1 over the ground surface GS, is possible.

The only moment that feeding of crop material into the bale forming device 9 may not be possible or is only limited possible is when a pivotal guiding roller 28.1, 28.2 or a pair of swing arms carrying a pivotal guiding roller 28.1, 28.2 passes the outlet 7 of the intake device 5.

It may be advantageous to provide a feeding channel bottom in the intake device 5 that is movable in a substantially vertical direction between a normal position and a lowered position. With the feeding channel bottom in the lowered position an interior volume of the intake device is increased in comparison with an interior volume of the intake device 5 in the normal position of the movable bottom. The bale forming apparatus 1 is configured to move the movable bottom from the normal position to the lowered position just before the pushing roller 24.1, 24.2 passes before the outlet 7 of the intake device 5 and the roller 8.2 by rotation of the supporting disks 23, and to move the bottom back from the lowered position to the normal position after the pivotal guiding roller 28.1, 28.2 next to this pushing roller 24.1, 24.2 has passed the outlet 7.

In this way the interior and therefore the capacity of the intake device 5 may temporarily be increased to store extra crop material when a pushing roller 24.1, 24.2 or a pivotal guiding roller 28.1, 28.2 pass before the outlet 7.

In one embodiment an active means, e.g. a hydraulic cylinder, moves the channel bottom downwards and upwards. In a further embodiment the channel bottom is lowered downwards by crop material in the intake device against the force of a resilient means, e.g. against a spring. The resilient means moves up the channel bottom 5 again if the pressure exerted by the crop material decreases.

It is remarked that hereinabove only the guiding rollers to form a bale forming chamber have been denoted and described in detail. The bale forming apparatus will have multiple further guiding rollers at fixed and movable location to guide the endless belt(s) 10. These guiding rollers may also include tensioning guiding rollers to tension the endless belt(s) 10 and driving rollers to drive the endless belt(s) 10, in particular the guiding roller on the tensioning arm 60. These guiding rollers are shown in FIGS. 1 to 21 but are not denoted by reference numerals.

The movements of the tailgate 11 and of the supporting disks 23 may be performed by any suitable devices. In an embodiment, these movements are caused by hydraulic devices, such as hydraulic cylinders. Other embodiments maybe used, e.g. electrical motors or pneumatic cylinders.

FIG. 12 to FIG. 16 demonstrate an embodiment for rotating a supporting disk 23 and for releasing the pivotal guiding roller 28.2 from the pushing roller 24.2. The actuating cylinder 31 is connected
- with the frame 2 in the stationary pivoting axis 95 and
- with the actuator arm 30 in the pivoting axis 96.

The actuating cylinder 31 rotates the supporting disk 23.

In the situation of FIG. 12 the disk engaging hook 33 engages the coupling pin 34.1. A disk locking cylinder 83 mounted at the free end of the actuator arm 30 can pivot the disk engaging hook 33 into an engaging state and into a releasing state.

The vertical tailgate cylinder 14 and the horizontal tailgate cylinder 15 pivot the tailgate 11 from the bale receiving position into the bale supporting position. The pivotal guiding roller 28.2 is mounted on the free end of the swing arm 26.1. A swing arm pivoting hook 41 can be rotated around the stationary pivoting axis 45 and has a catching and locking hook 46 and an arcuate guiding edge 44 facing towards the disk rotating axis 25, cf. FIG. 12. A hydraulic horizontal swing arm hook cylinder 42 can rotate the swing arm pivoting hook 41 around the stationary pivoting axis 45. This swing arm hook cylinder 42 is pivotally connected with the swing arm pivoting hook 41 and the frame 2. The locking pawl 29.1 is rotatable connected with the supporting arm 90.1 of the supporting disk 23 in the pivoting axis 63.1.

The sequence from FIG. 12 to FIG. 16 shows the following steps:

The actuating cylinder 31 in cooperation with the actuator arm 30 rotates the supporting disk 23.

The vertical tailgate cylinder 14 and the horizontal tailgate cylinder 15 pivot the tailgate 11 from the bale receiving position into the bale supporting position.

The horizontal swing arm hook cylinder 42 rotates the swing arm pivoting hook 41 around the axis 45.

The locking pawl 29.1 is pivoted from the locking position (FIG. 12) into the releasing position (FIG. 16) by rotating the locking pawl 29.1 around the pivoting axis 63.1.

The arcuate edge 44 of the swing arm pivoting hook 41 guides the swing arm 26.1.

In the situation shown in FIG. 12 and in FIG. 13 the locking pawl 29.1 engages the coupling pin 40.1 which is mounted on the swing arm 26.1. The pivotal guiding roller 28.2 follows the pushing roller 24.2. In the situation shown in FIG. 16 the coupling pin 40.1 engages the catching and locking hook 46 of the swing arm pivoting hook 41. The swing arm pivoting hook 41 restricts the further pivotal movement of the swing arm 26.1.

The sequence from FIG. 17 to FIG. 21 shows the inverse step: The locking pawl 29.1 is pivoted into the locking position and establishes a releasable connection between the two rollers 24.1 and 28.1. The locking pawl 29.1 catches the coupling pin 40.1 mounted on the swing arm 26.1.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

| Reference Signs | |
|---|---|
| B | first bale |
| B' | second bale |
| GS | ground surface |
| TD | travelling direction of the bale forming apparatus 1 |
| 1 | bale forming apparatus |
| 2 | frame |
| 3 | wheels |
| 4 | front end with towing unit |
| 5 | intake device, comprises inlet 6 and outlet 7 |
| 6 | inlet of intake device 5 |
| 7 | outlet of intake device 5 |
| 8.1, 8.2 | stationary supporting rollers |
| 9 | bale forming device, comprises endless belt(s) 10 |
| 10 | endless belt(s), operate as the bale forming means |
| 11 | pivotal tailgate, serves as bale supporting construction |
| 12 | first tailgate lever arm of tailgate frame 17 |
| 13 | second tailgate lever arm of tailgate frame 17 |
| 14 | hydraulic vertical tailgate cylinder |
| 15 | hydraulic horizontal tailgate cylinder |
| 16 | pivoting axis of tailgate frame part 17 with respect to the first tailgate lever arm 12 |
| 17 | pivotal tailgate frame |
| 18 | pivotal tailgate bottom |
| 19 | tailgate bottom roller, mounted at tailgate bottom 18 |
| 20 | wrapping device with a reel 88 for wrapping material |
| 21 | third tailgate lever arm of tailgate frame 17 |
| 22 | pivoting axis of the tailgate bottom 18 with respect to the tailgate frame 17 |
| 23 | supporting disks, carries the pushing rollers 24.1, 24.2 and the swing arms (guiding member arms) 26.1, 26.2 |
| 24.1 | pushing roller, pushes the second bale B' |
| 24.2 | further pushing roller, pushes the first bale B |
| 25 | disk rotating axis of supporting disks 23 |
| 26.1, 26.2 | swing arms for pivoting the pivotal guiding roller 28.1, 28.2 |
| 27.1, 27.2 | pivoting axes of the swing arms 26.1, 26.2 |
| 28.1, 28.2 | pivotal guiding rollers, mounted on the swing arms 26.1, 26.2 |
| 29.1, 29.2 | locking pawls for locking the pushing roller 24.1, 24.2 with the pivotal guiding rollers 28.1, 28.2 |
| 30 | actuator arm |
| 31 | actuating cylinder for moving the actuator arm 30, pivotally connected with the actuator arm 30 |
| 32 | coupling device, comprises the disk engaging hook 33 and the disk locking cylinder 83 |
| 33 | disk engaging hook of the coupling device, can engage one coupling pin 34.1, 34.2, 34.3 |
| 34.1, 34.2, 34.3 | coupling pins which can be coupled with the disk engaging hook 33 |
| 35 | retarding device for the supporting disks 23 |
| 36 | fixed guiding element above the front supporting roller 8 |
| 37 | bale release control device |
| 40.1 | coupling pin, mounted on the swing arm 26.1 for the pivotal guiding roller 28.1 |
| 41 | swing arm pivoting hook, guides the swing arm 26.1 |
| 42 | hydraulic swing arm hook cylinder, rotates the swing arm pivoting hook 41 |
| 44 | arcuate guiding edge of the swing arm pivoting hook 41 |
| 45 | pivoting axis of the swing arm pivoting hook 41 |
| 46 | catching and locking hook of the swing arm pivoting hook 41 |
| 47.1 | pivot axis of the looking pawl 29.1 |
| 80 | hydraulic tailgate bottom cylinder |
| 83 | disk locking cylinder for moving the coupling device 32 |
| 88 | reel for wrapping material |
| 100 | disk rotating direction |

The invention claimed is:

1. A bale forming apparatus for forming cylindrical bales of material, the bale forming apparatus comprising:
- an intake device with an outlet;
- a bale forming device;
- a bale supporting construction;
- at least one pushing member;
- several guiding members;

a holding device for the pushing member; and
a drive for the holding device,
wherein the bale forming device comprises a bale forming mechanism adapted for surrounding a bale forming chamber adjacent to the outlet,
wherein the guiding members are adapted for guiding the bale forming mechanism,
wherein the bale forming mechanism is guided around all or at least some of the guiding members,
wherein the at least one pushing member or every pushing member is mechanically connected with the holding device,
wherein the intake device is adapted for conveying material through the outlet into the bale forming chamber,
wherein the bale forming apparatus is adapted for forming from the conveyed material a bale in the bale forming chamber,
wherein the bale supporting construction is adapted for carrying a bale which has been formed in the bale forming chamber,
wherein the holding device is mounted such that it can be rotated around a rotating axis,
wherein the drive is adapted for rotating the holding device around the rotating axis in a rotating direction,
wherein the bale forming apparatus is arranged such that rotating the holding device around the rotating axis in the rotating direction causes the at least one pushing member or every pushing member to be rotated on a circular path in a pushing direction,
wherein the bale forming apparatus is further arranged such that rotating the pushing member in the pushing direction pushes a bale formed in the bale forming chamber away from the outlet and onto the bale supporting construction,
wherein at least one guiding member is pivotally mounted such that the pivotal guiding member can be pivoted into a guiding position,
wherein the at least one guiding member or every pivotal guiding member being in the guiding position contributes to guide the bale forming mechanism such that the bale forming chamber surrounded by the bale forming mechanism and adapted for forming a further bale is also provided while the bale supporting construction carries the bale having been pushed by the pushing member,
wherein the bale supporting construction is pivotally mounted such that the bale supporting construction can be pivoted into a bale receiving position and into at least one further position,
wherein the bale forming apparatus is adapted such that the pushing member being rotated in the pushing direction pushes a bale onto the bale supporting construction being in the bale receiving position,
wherein the bale forming apparatus is further adapted for pivoting the bale supporting construction carrying the bale from the bale receiving position into one further position, and
wherein a distance between the outlet and the bale on the bale supporting construction being in the further position is larger than a distance between the outlet and the bale on the bale supporting construction being in the bale receiving position.

2. The bale forming apparatus according to claim 1, wherein the at least one pushing member or every pushing member which is adapted for pushing the bale in the pushing direction is connected with the holding device such that the pushing member keeps its position relative to the holding device during the rotation of the holding device around the rotating axis in the rotating direction.

3. The bale forming apparatus according to claim 1, wherein the pivotal guiding member is pivotally connected with the holding device by means of at least one guiding member arm, and
wherein the guiding member arm carries the pivotal guiding member and can be rotated with respect to the holding device for pivoting the pivotal guiding member into the guiding position.

4. The bale forming apparatus according to claim 3, wherein the guiding member arm is mounted such that it can be pivoted around a guiding member arm pivoting axis, and the bale forming apparatus is arranged such that a distance occurs between the rotating axis and the guiding member arm pivoting axis.

5. The bale forming apparatus according to claim 3, wherein the drive is adapted for rotating the holding device in the rotating direction from a start position into an end position, this rotation effects the pushing member pushing a bale onto the bale supporting construction and the guiding member arm pivoting the pivotal guiding member into the guiding position.

6. The bale forming apparatus according to claim 5, wherein the bale forming apparatus is arranged such that rotating the holding device from the start position to the end position causes the guiding member arm to shift the pivotal guiding member into the guiding position in a direction away from the pushing member and towards the outlet.

7. The bale forming apparatus according to claim 3, wherein:
the bale forming apparatus further comprises a locking device, the locking device is arranged for being pivoted into a locking position and into a releasing position,
the locking device in the locking position connects the pushing member with the pivotal guiding member such that rotating the pushing member along the circular path causes the pivotal guiding member to follow the pushing member, and
the bale forming apparatus is further adapted such that pivoting the locking device into the releasing position releases the connection between the pushing member and the pivotal guiding member.

8. The bale forming apparatus according to claim 1, wherein the pivotal guiding member engages into at least one longitudinal slot and is guided by means of the slot when being pivoted into the guiding position.

9. The bale forming apparatus according to claim 1, wherein the holding device comprises at least one disk, the drive for the holding device is adapted for rotating the disk around the rotating axis, and the or every pushing member is connected with the disk.

10. The bale forming apparatus according to claim 9, wherein the holding device comprises two disks, which disks extends in two parallel planes, the or every pushing member is connected with both disks and extends between these two disks.

11. The bale forming apparatus according to claim 1, wherein the bale forming apparatus comprises two pushing members, the pushing members are mechanically connected with the holding device such that the rotating axis is arranged between these two pushing members, and every one of these two pushing members is arranged for pushing a bale onto the bale supporting construction when being rotated in the pushing direction while the other pushing member is in a parking position.

12. The bale forming apparatus according to claim 1, wherein the bale forming apparatus comprises two pivotal guiding members, every one of these pivotal guiding members is arranged for being pivoted into the guiding position and into a parking position, and the bale forming apparatus is adapted such that the one pivotal guiding member is in the guiding position and contributes to form the bale forming chamber while the other pivotal guiding member is in the parking position.

13. The bale forming apparatus according to claim 1, wherein the bale forming apparatus is adapted such that the pushing member being in a pushing start position is spaced away from the bale forming mechanism, and rotating the pushing member in the pushing direction causes the pushing member to hit the bale forming mechanism from outside of the bale forming chamber and to push a segment of the bale forming mechanism as well as a bale in the bale forming chamber away from the outlet and onto the bale supporting construction.

14. The bale forming apparatus according to claim 1, wherein the holding device comprises an idler axle and at least one holding element,
wherein the idler axle can be rotated around the rotating axis of the holding device, the holding element is rigidly connected with the idler axle, and the drive is adapted for rotating the or every holding element around the idler axle.

15. The bale forming apparatus according to claim 1, wherein the drive for the holding device comprises at least one actuator arm and an actuator to make the actuator arm oscillate,
wherein the holding device comprises different coupling locations for connecting the actuator arm with the holding device, and the drive is adapted for coupling the actuator arm with the holding device in a coupling location, rotating the holding device in the rotating direction by moving the coupled actuator arm, releasing the coupling connection between the actuator arm and the holding device, and moving back the actuator arm.

16. The bale forming apparatus according to claim 1, wherein the bale forming apparatus comprises a further guiding member which is mounted at the bale supporting construction, the further guiding member is adapted for contributing to guide the bale forming mechanism, and the further guiding member is arranged such that rotating the pushing member along the circular path causes the further guiding member to be pivoted away from this circular path.

17. The bale forming apparatus according to claim 16, wherein the bale supporting construction comprises a bale carrying member, which is pivotally mounted and is adapted for carrying a bale, the further guiding member is mounted at the bale carrying member, and the bale carrying member is mounted such that pivoting the bale carrying member causes the further guiding member to be pivoted away from the circular path.

18. The bale forming apparatus according to claim 1, wherein the bale forming apparatus comprises a frame, the bale supporting construction is pivotally connected with the frame such that the bale supporting construction can be pivoted with respect to the frame into a bale receiving position and into a bale ejecting position,
wherein the bale forming apparatus is adapted such that the pushing member pushes a bale onto the bale supporting construction being in the bale receiving position when the pushing member is moved on the circular path, and
wherein the bale forming apparatus is further adapted to pivot the bale supporting construction carrying a bale from the bale receiving position into the bale ejecting position and to eject a bale when the bale supporting construction carrying this bale is pivoted into the bale ejecting position.

19. The bale forming apparatus according to claim 1, wherein:
the bale forming apparatus comprises a wrapping device with a reservoir for wrapping material,
the bale forming mechanism is arranged between the outlet and the wrapping device, and
the bale forming apparatus is adapted such that the wrapping device injects wrapping material into the space between the bale forming mechanism and a bale being on the bale supporting construction.

20. A method for forming cylindrical bales of material, the method comprising the steps of:
conveying material with an intake device through an outlet into a bale forming chamber adjacent to the outlet;
forming from the conveyed material a bale in the bale forming chamber by means of a bale forming mechanism, which is guided by several guiding members and surrounds the bale forming chamber;
rotating a holding device with a drive around a rotating axis in a rotating direction, wherein rotating the holding device in the rotating direction causes at least one pushing member being mechanically connected with the holding device being rotated on a circular path in a pushing direction, and wherein rotating the pushing member in the pushing direction causes the bale formed in the bale forming chamber being pushed away from the outlet and onto a bale supporting construction;
pivoting a pivotal guiding member into a guiding position, wherein the pivotal guiding member pivoted in the guiding position contributes to guide the bale forming mechanism such that a bale forming chamber adjacent to the outlet and surrounded by the bale forming mechanism is also provided while the bale supporting construction carries the bale having been pushed by the pushing member; and
starting the forming of a further bale in the provided bale forming chamber,
wherein a bale supporting construction pivoting step is performed, the bale supporting construction pivoting step comprises the step of pivoting the bale supporting construction carrying the bale from a bale receiving position into a further position, wherein the bale supporting construction pivoting step increases a distance between the bale on the bale supporting construction and the outlet, and the bale supporting construction pivoting step is performed after the bale is pushed away from the outlet and onto the bale supporting construction being in the bale receiving position.

21. The bale forming method according to claim 20, wherein the pivotal guiding member is pivotally connected with the holding device via a guiding arm, and
wherein rotating the holding device in the rotating direction causes the guiding arm to pivot the pivotal guiding member into the guiding position.

22. The bale forming method according to claim 20, wherein the pushing member is at least temporally connected with the pivotal guiding member by means of a locking device being in a locking position while the pushing member performs the movement on the circular path, the connection causes the pivotal guiding member to follow the pushing member being rotated on a circular path, the locking device is pivoted from the locking position into a releasing position while the pushing member performs the movement on the circular path or has completed this movement, and the pivotal guiding member is pivoted into the guiding position after the locking device is pivoted into the releasing position.

23. The bale forming method according to claim 20, wherein a wrapping device supplies wrapping material to the space between the bale forming mechanism and the bale on the bale supporting construction, and wherein the bale forming mechanism is arranged between the outlet and the wrapping device.

\* \* \* \* \*